United States Patent
Toda et al.

(10) Patent No.: US 10,659,154 B2
(45) Date of Patent: May 19, 2020

(54) OPTICAL MODULE AND CONTROL METHOD OF CONTROLLING CENTER WAVELENGTH OF OPTICAL FILTER

(71) Applicant: Fujitsu Optical Components Limited, Kawasaki-shi, Kanagawa (JP)

(72) Inventors: Hoshihiko Toda, Kawasaki (JP); Toshio Ishii, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/426,602

(22) Filed: May 30, 2019

(65) Prior Publication Data

US 2019/0379453 A1 Dec. 12, 2019

(30) Foreign Application Priority Data

Jun. 6, 2018 (JP) ................................ 2018-108664

(51) Int. Cl.
| | | |
|---|---|---|
| *H04B 10/079* | (2013.01) | |
| *G02B 6/42* | (2006.01) | |
| *H04J 14/02* | (2006.01) | |
| *H04B 10/67* | (2013.01) | |

(52) U.S. Cl.
CPC ..... *H04B 10/07955* (2013.01); *G02B 6/4286* (2013.01); *H04B 10/07957* (2013.01); *H04B 10/673* (2013.01); *H04J 14/0221* (2013.01)

(58) Field of Classification Search
CPC ........ H04B 10/07955; H04B 10/07957; H04B 10/67; G02B 6/4286
See application file for complete search history.

(56) References Cited

U.S. PATENT DOCUMENTS

| | | | | |
|---|---|---|---|---|
| 6,597,480 B1* | 7/2003 | Iida | ........................ | H04B 10/67 398/141 |
| 2003/0133649 A1* | 7/2003 | Hakimi | .............. | G02B 6/12004 385/24 |
| 2004/0001715 A1* | 1/2004 | Katagiri | ............. | H04B 10/2525 398/81 |
| 2004/0136728 A1* | 7/2004 | Sekiya | ............. | H04B 10/25073 398/177 |

(Continued)

FOREIGN PATENT DOCUMENTS

JP 2005-210264 8/2005

OTHER PUBLICATIONS

Patent Abstracts of Japan English abstract for Japanese Patent Publication No. 2005-210264, published Aug. 4, 2005.

*Primary Examiner* — Casey L Kretzer
(74) *Attorney, Agent, or Firm* — Staas & Halsey, LLP

(57) ABSTRACT

An optical module has an optical amplifier that amplifies an optical signal in which multiple wavelengths are multiplexed, an optical demultiplexer that separates the multiple wavelengths from the optical signal having been amplified by the optical amplifier, a first photodetector that monitors the optical signal at an input side of the optical amplifier, a second photodetector that monitors each of the multiple wavelengths at an output side of the optical demultiplexer, and a control circuit that controls a center wavelength of a filter of the optical demultiplexer based upon a first output from the first photodetector and a second output from the second photodetector.

14 Claims, 19 Drawing Sheets

(56) References Cited

U.S. PATENT DOCUMENTS

| | | |
|---|---|---|
| 2004/0228638 A1 | 11/2004 | Sayyah et al. |
| 2005/0157976 A1 | 7/2005 | Furukawa et al. |
| 2009/0060497 A1 | 3/2009 | Way |
| 2010/0239246 A1* | 9/2010 | Taylor ................ H04B 10/572 398/34 |
| 2012/0121259 A1* | 5/2012 | Kuwata ............ H04B 10/07955 398/38 |
| 2015/0261061 A1* | 9/2015 | Akiyama ................ G02F 1/225 385/2 |
| 2015/0277053 A1* | 10/2015 | Zheng ................ G02B 6/29341 385/31 |
| 2016/0261343 A1* | 9/2016 | Akasaka .......... H04B 10/25073 |

* cited by examiner

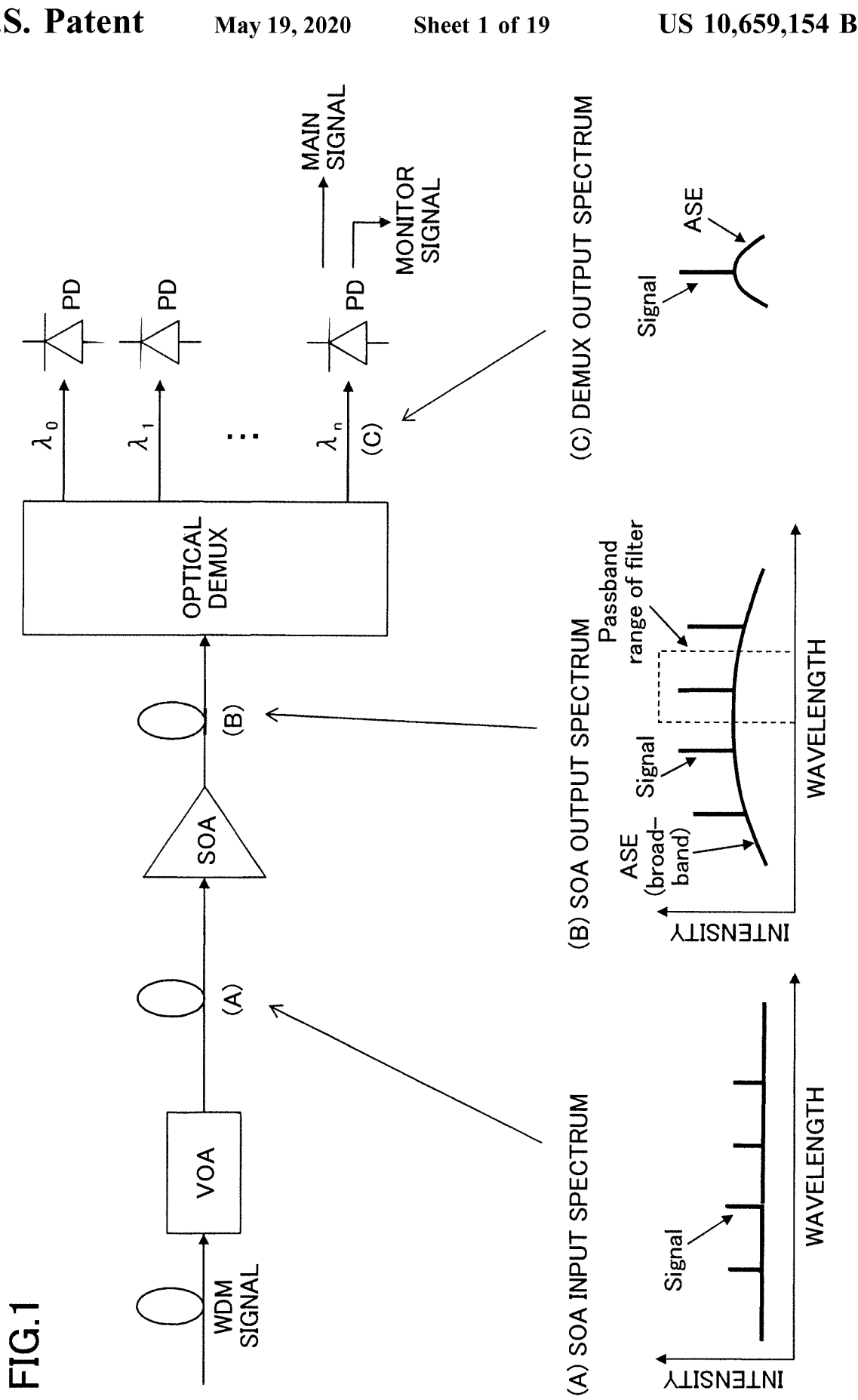

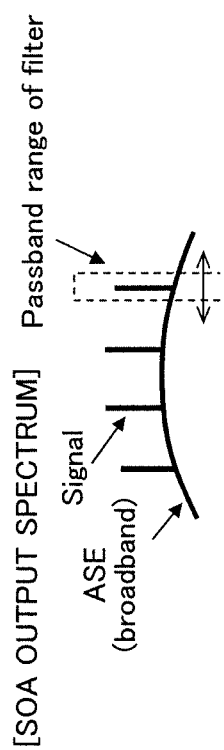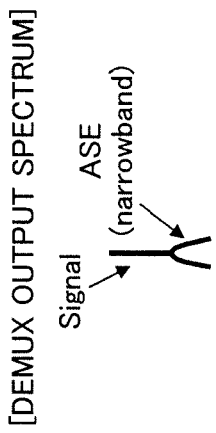

FIG.5

| TEMPERATURE | LIGHT INTENSITY |
|---|---|
| T1 | $P1_{filter}$ |
| T2 | $P2_{filter}$ |
| ⋮ | ⋮ |
| Ti | $Pi_{filter}$ |

OPTICAL MODULE AND CONTROL METHOD OF CONTROLLING CENTER WAVELENGTH OF OPTICAL FILTER

CROSS-REFERENCE TO RELATED APPLICATIONS

This application is based upon and claims priority to earlier filed Japanese Patent Application No. 2018-108664 filed Jun. 6, 2018, which is incorporated herein by reference in its entirety.

FIELD

The present invention relates to an optical module and a control method.

BACKGROUND

Due to rapid increase of the volume of data communications, optical modules compatible with 400 Gigabit Ethernet (400 GbE) standards are being developed. One of the 400 GbE standards adopts wavelength division multiplexing (WDM) with 4-level pulse amplitude modulation (PAM4) to increase the bit rate. The current target of 400 GbE transmission distance is basically a short distance such as 2 km or 10 km; however, discussions on standardization of long-distance optical communications over 10 km (e.g., 40-km transmission) are about to start. In increasing the transmission distance for 400 GbE, a scheme of securing a dynamic range using an optical amplifier may be discussed, as in ER4 which is a standard for 40 Km transmission of 100-Gbps Ethernet.

FIG. 1 is a schematic diagram of a WDM receiver frontend circuit. A variable optical attenuator (VOA) and a semiconductor optical amplifier (SOA) are provided in the receiver. When a low-power WDM signal is received, the received signal in which multiple channels with different wavelengths are multiplexed is amplified collectively by the SOA. When a high-power WDM signal is received, the WDM signal is attenuated collectively by the VOA. After demultiplexing, the respective wavelengths are detected at the associated photodetectors such as photo diodes (PDs) to secure the dynamic range.

In WDM systems, optical filters are generally used for demultiplexing. As illustrated in the states (A) and (B) of FIG. 1, when amplifying the received signal light collectively using the SOA, amplified spontaneous emission (ASE) increases, and consequently, the photodetection sensitivity decreases as illustrated in the state (C).

Degradation in photodetection sensitivity due to optical noise becomes more serious when the number of levels of multilevel modulation increases. In case of multilevel modulation at or over 4 levels, the signal-to-noise ratio becomes lower than that of binary modulation, and the influence of ASE noise on the photodetection sensitivity becomes conspicuous. For example, an optical demultiplexer or a wavelength filter for LAN-WDM has a bandwidth of about 6 nm to 7 nm in order to cover the wavelength range of input light. With such a broad passband, ASE noise cannot be reduced sufficiently (see the State (C) of FIG. 1). In coarse-WDM (CWDM), the wavelength interval of transmitted signal light is broader, and the bandwidth of the optical demultiplexer may become as wide as about 30 nm. The ASE noise reduction becomes more difficult.

A configuration that adaptively suppresses leakage of ASE into the photodetectors has been proposed. See, for example, Patent Document 1.

Patent Document 1: Japanese Patent Application Laid-open Publication No. 2005-210264.

SUMMARY

In one aspect of the invention, an optical module has
an optical amplifier that amplifies an optical signal in which multiple wavelengths are multiplexed,
an optical demultiplexer that separates the multiple wavelengths from the optical signal having been amplified by the optical amplifier,
a first photodetector that monitors the optical signal at an input side of the optical amplifier,
a second photodetector that monitors each of the multiple wavelengths at an output side of the optical demultiplexer, and
a control circuit that controls a center wavelength of a filter of the optical demultiplexer based upon a first output from the first photodetector and a second output from the second photodetector.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 1 is a schematic diagram of a typical WDM-scheme receiver frontend circuit;

FIG. 2B illustrates a SOA output spectrum at output (B) of FIG. 2A;

FIG. 2C illustrates a DEMUX output spectrum at output (C) of FIG. 2A;

FIG. 5 illustrates an example of record of monitoring results acquired in the operation flow of FIG. 4;

DESCRIPTION OF EMBODIMENTS

ASE noise may be reduced by using a narrowband wavelength filter; however, the wavelength range stipulated by fiber optic communication standards may not be covered. When a wavelength fluctuates, the signal light of a certain wavelength to be separated will deviate from the associated passband range and optical communications may not be established. A novel optical module or a control technique that suppresses degradation in receiver sensitivity due to ASE noise is desired.

In embodiments, the center wavelength of each passband of an optical demultiplexer is adjusted based upon a monitoring result of an input light monitored before optical amplification, as well as monitoring results of the respective wavelengths monitored after the optical amplification and demultiplexing, thereby reducing degradation in receiver sensitivity due to ASE noise.

A compact optical module is also achieved by implementing the SOA and the optical demultiplexer on the same platform.

First Embodiment

Figure 2A:
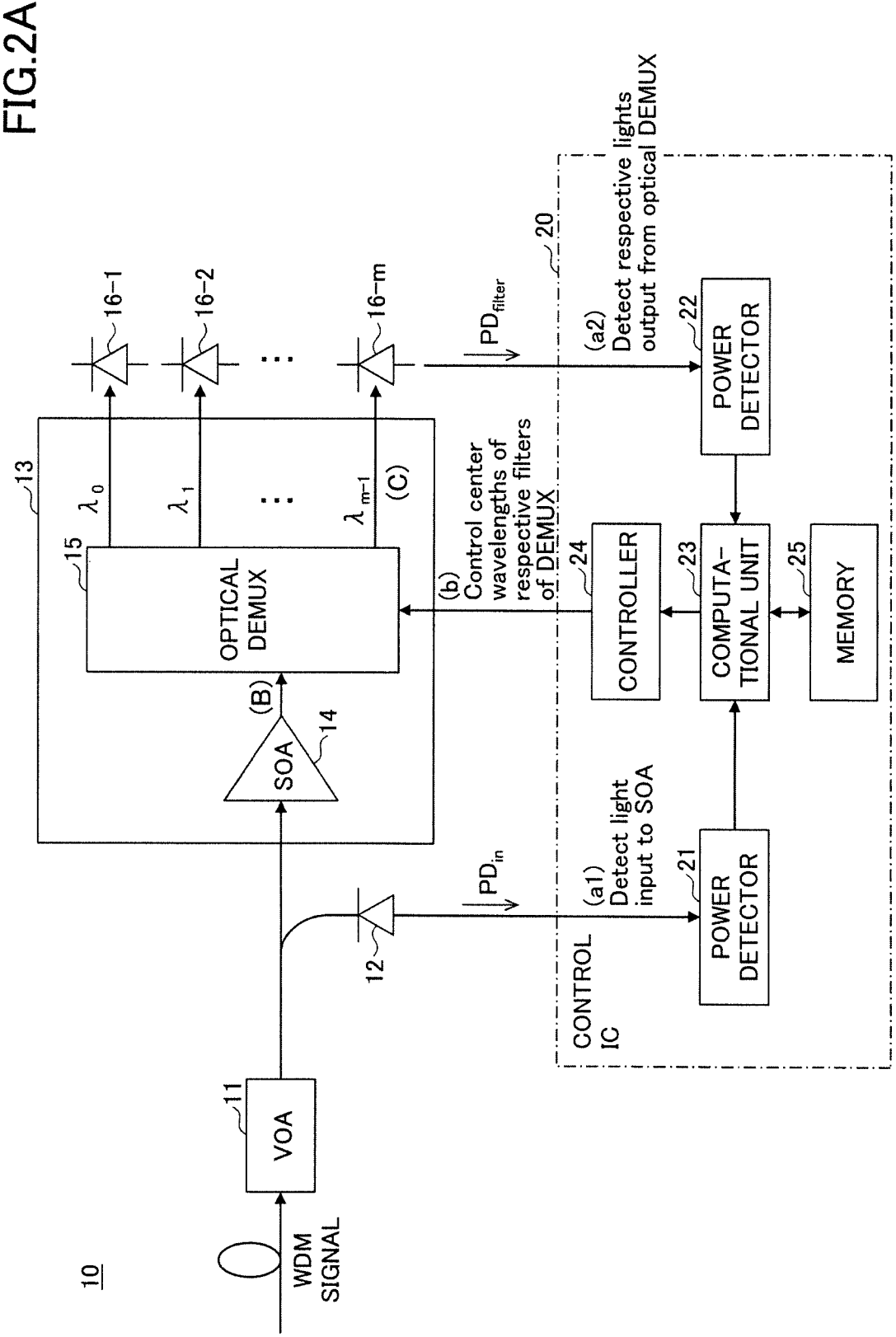
FIG. 2A is a schematic diagram of an optical module according to a first embodiment.

FIG. 2A is a schematic diagram of an optical module 10 according to the first embodiment. FIG. 2B illustrates a spectrum of light (B) acquired after optical amplification. FIG. 2C illustrates a spectrum of light (C) acquired after demultiplexing. The optical module 10 is, for example, a compact optical receiver module with a built-in optical amplifier. The optical module 10 has a wavelength separation platform 13, a control integrated circuit (IC) 20, a PD 12, and PDs 16-1 to 16-m.

Figure 15:
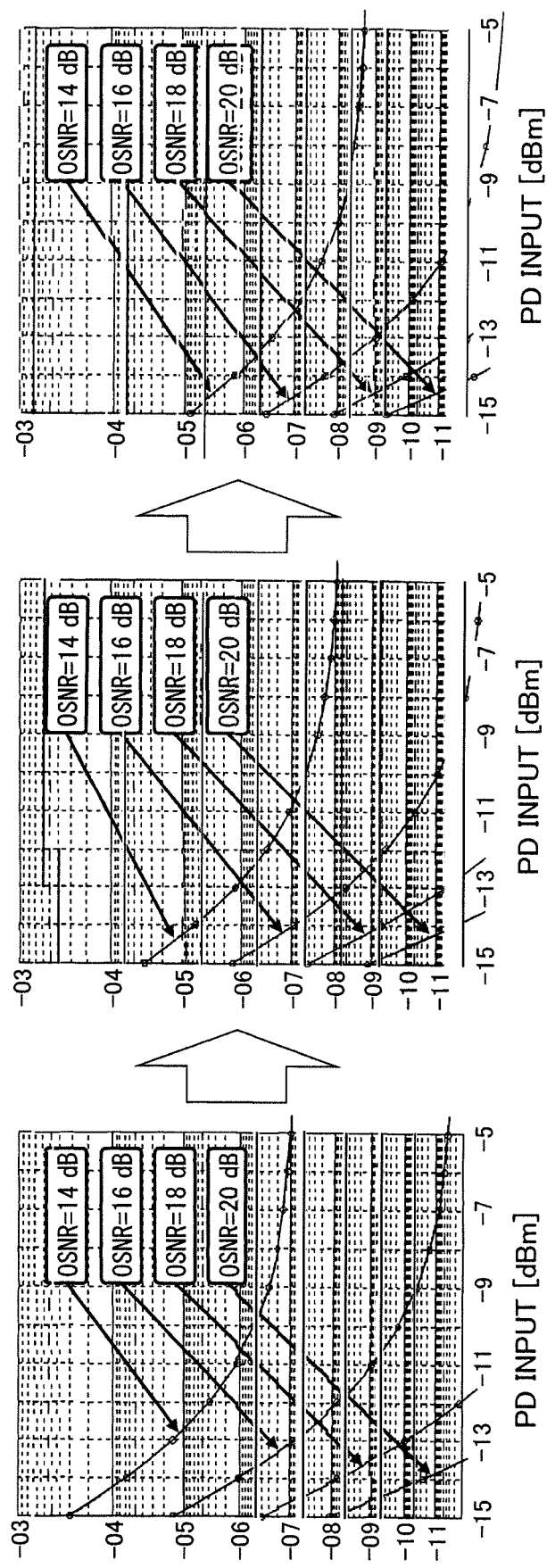
FIG. 15 illustrates an advantageous effect of the invention.

The wavelength separation platform 13 has an SOA 14 and an optical demultiplexer (labeled as "DEMUX" in the FIG. 15, which are provided on the same substrate. A portion of the incident light to the SOA 14 is branched and the intensity of the incident light is monitored by the PD 12 before the SOA 14. The PDs 16-1 to 16-m (which may be referred to comprehensively as "PD16") are optically connected to the outputs of the optical demultiplexer 15 to monitor the channels of the respective wavelengths ($\lambda_0$ to $\lambda_{m-1}$).

A VOA 11 may be provided before the wavelength separation platform 13. When a high-power optical signal is received, the VOA 11 attenuates the intensity of the optical signal to a level slightly over the minimum reception sensitivity of the optical module 10. The optical signal is, for example, a WDM signal in which multiple wavelength channels are multiplexed. A portion of the WDM signal attenuated as necessary to an appropriate level by the VOA 11 is branched before the SOA 14 and detected at the PD 12. The detection result of the PD12 is denoted as "$PD_{1r}$". The major part of the WDM signal other than the branched monitor light is amplified collectively by the SOA 14 to compensate for the optical loss in the transmission path.

After the amplification, the signal light is demultiplexed into multiple wavelengths by the optical demultiplexer 15. For each of the wavelengths output from the optical demultiplexer 15, a portion of the light is detected by corresponding one of the PDs 16-1 to 16-m, and a monitoring result of $PD_{filter}$ is output. The main signal lights of the respective wavelengths, other than the monitored lights, are supplied to appropriate optical devices such as optical switches, optical transponders, or the like.

The output of the PD 12 acquired at the upstream of the SOA 14, and the outputs of the respective PDs 16 acquired at the downstream of the optical demultiplexer 15 are connected to the inputs to the control IC 20. The control IC 20 may be implemented with a processor such as a microchip of CPU and a memory, or alternatively, it may be implemented with a logic device such as a field programmable gate array (FPGA) with a built-in memory.

The control IC 20 includes a first power detector 21, a second power detector 22, a computational unit 23, a controller 24, and a memory 25. The first power detector 21 detects the power level or the intensity of light monitored at the PD 12 before optical amplification, as indicated by arrow (a1). The second power detector 22 detects the power levels or the intensities of lights monitored at PDs 16-1 to 16-m after amplification and demultiplexing, as indicated by arrow (a2).

The computational unit 23 calculates an amount of control on each of the passbands of the optical demultiplexer 15 that serves as an optical filter, based upon the detection results of the first power detector 21 and the second power detectors 22. The controller 24 controls transmission characteristics of the optical demultiplexer 15, as indicated by arrow (b), such that the center wavelengths of the respective passbands of the optical filter are consistent with or approaching to the associated wavelengths contained in the received light, based upon the output of the computational unit 23. The memory 25 stores parameters used for control of the transmission characteristics of the optical duplexer 15 or data acquired from the control.

By controlling the center wavelengths of the respective passbands of the optical demultiplexer 15 based upon the monitoring results acquired before the SOA 14 and after the optical demultiplexer 15, each of the wavelengths can be extracted through a narrowband as illustrated in FIG. 2C, from the optical signal collectively amplified and containing broadband ASE illustrated in FIG. 2B.

In controlling the transmission characteristics of the optical demultiplexer 15, using only the monitoring result (e.g., light intensity) of transmitted light through the wavelength filter may cause tuning error or mistuning during the control on the wavelength filter when, for example, the input light level has suddenly fallen due to influence of fluctuation or disturbance on the transmission path. In such a case, the level change in the input light may be judged incorrectly as wavelength shifting in the filter tuning, and wrong operation may be carried out for the tuning of the wavelength filter. To avoid this inconvenience, the embodiment uses light intensity information acquired before the optical amplification, and suppresses inappropriate operations in filter tuning and deterioration of the receiver sensitivity. By this configuration, multiple channels of different wavelengths can be separated correctly from a collectively amplified WDM signal light.

Figure 3:
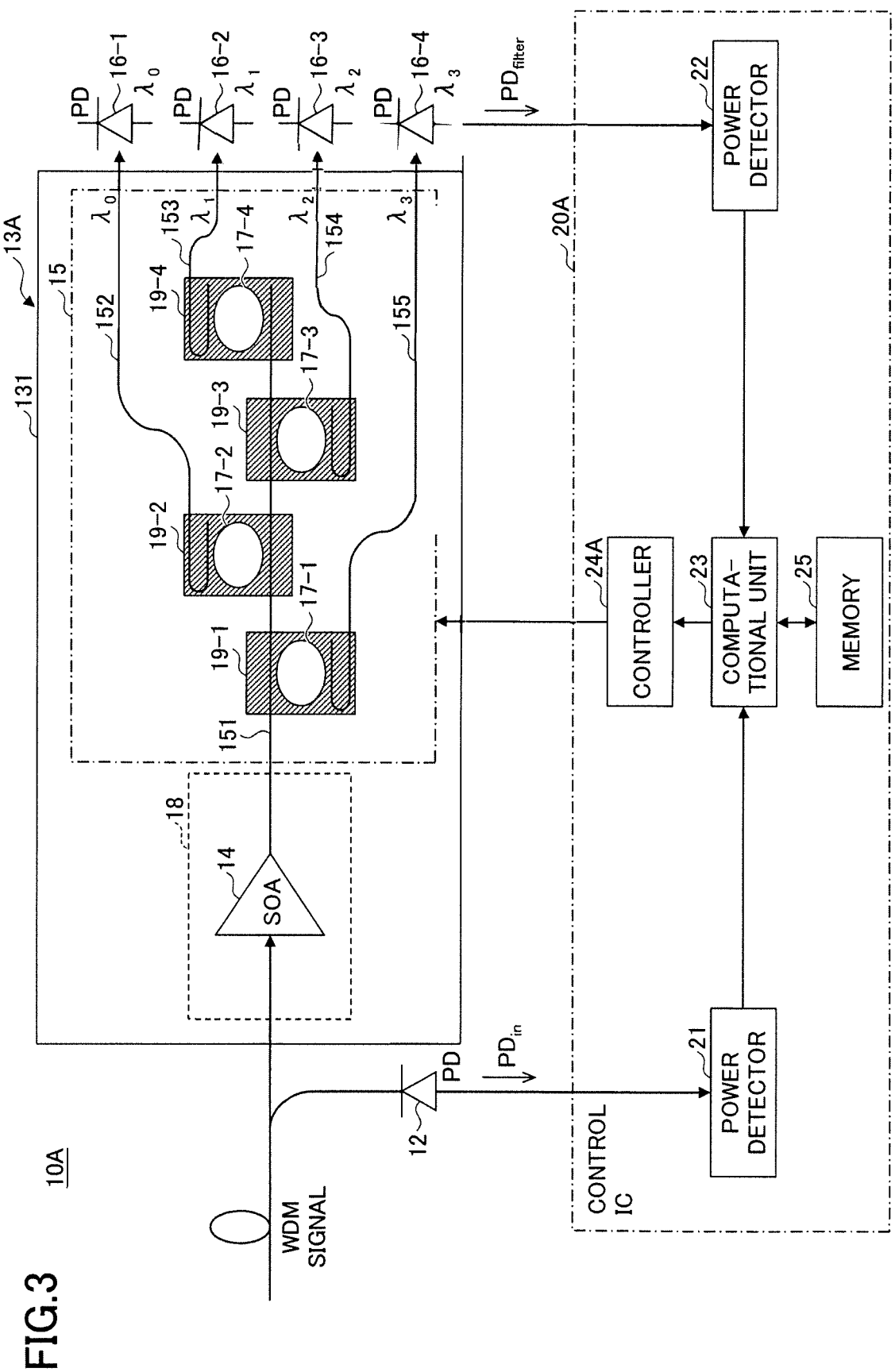
FIG. 3 is a schematic diagram of an optical module with a wavelengths demultiplexing platform.

FIG. 3 illustrates a configuration example of the wavelength separation platform 13A. The wavelength separation platform 13A of the optical module 10A includes, for example, an optical demultiplexer 15 formed by a silicon photonics technology on a substrate 131, and a SOA 14 mounted on the substrate 131. The SOA 14 may be placed in a groove or a terrace formed in the substrate 131, such that the gain waveguide of the SOA 14 is optically connected to the optical waveguide formed in the substrate 131. A thermoelectric cooler (TEC) 18 may be provided under the substrate 131 at a position corresponding to the SOA 14 to maintain the operating temperature of the SOA 14 constant.

The optical demultiplexer 15 formed of silicon (Si) waveguides has ring resonators 17-1 to 17-4 corresponding to the wavelengths in use. Heaters 19-1 to 19-4 are provided for the respective ring resonators 17-1 to 17-4. A set of the ring resonators 17-1 to 17-4 is an example of a set of filter elements. By controlling the temperatures of the heaters 19-1 to 19-4, the refractive indexes of the optical waveguides forming the ring resonators 17-1 to 17-4 change and the resonant wavelengths are controlled.

Although FIG. 3 illustrates the optical demultiplexer 15 for separating four wavelengths $\lambda_0$ to $\lambda_3$; the invention is not limited to this example. By providing an appropriate number (m) of ring resonators 17 in an appropriate layout, m wavelengths (where m is an integer equal to or greater than 2) can be separated.

A portion of the received WDM signal is monitored by PD 12 at the input side of the SOA 14, and the monitoring result ($PD_{in}$) is supplied to the first power detector 21. The intensities of the respective wavelengths are monitored by PDs 16-1 to 16-4 at the output side of the optical demultiplexer 15, and the monitoring result ($PD_{filter}$) is supplied to the second power detector 22. The computational unit 23 calculates the amounts of control for the ring resonators 17-1 to 17-4 based upon the detection results of the first power detector 21 and the second power detector 22. The controller 24A controls the resonance frequencies of the ring resonators 17-1 to 17-4 based upon the calculated control amounts.

More particularly, the controller 24A controls the temperatures of or the electrical voltages applied to the heaters 19-1 to 19-4 provided for the ring resonators 17-1 to 17-4 to adjust the refractive indexes of the optical waveguides forming the ring resonators 17-1 to 17-4 so as to bring the center wavelengths of the respective passbands of the optical demultiplexer 15 to be consistent with or closer to the target wavelengths.

Using the PD 12 arranged at the input side of the SOA 14, wavelength control is carried out while suppressing adverse influence of intensity decline in the input light due to external disturbance or the like. Besides, by using silicon optical waveguide for optical connection between the SOA 14 and the optical demultiplexer 15, additional element(s) such as a lens or a fiber holding mechanism can be omitted.

Since the diameters of the ring resonators 17-1 to 17-4 are several micrometers or less, the optical filter (that is, the optical demultiplexer 15) can be made compact, compared with a conventional demultiplexer using a dielectric multilayer film whose size is on an order of millimeter. The length of the wavelength separation platform 13A along the optical axis can also be reduced to about ten millimeters or few more than ten millimeters at most, in spite of both the SOA 14 and the optical demultiplexer 15 being provided in it. Even when a temperature control area up to a five millimeter size along the optical axis is provided for the TEC 18, the wavelength separation platform 13 with the built-in SOA 14 can still be made compact compared with a mechanical configuration, by appropriately arranging micron-order sized ring resonators to form the optical demultiplexer 15 with wavelength filters.

The optical demultiplexer 15 of FIG. 3 is advantageous because wavelengths are separated efficiently. Typically, an amplification characteristic of a SOA is one that the gain becomes higher at or near the center part of the wavelength range (e.g., $\lambda 1$ and $\lambda 2$) and that the gain decreases at or near the edges of the wavelength range (e.g., $\lambda 0$ and $\lambda 3$). In FIG. 3, wavelengths at or near the edges of the gain band of the SOA 14 are extracted from optical channels with less propagation loss, compared with wavelengths at or near the center part of the gain band. That is, wavelength demultiplexing is carried out in accordance to the gain characteristics of the SOA 14 in the embodiment.

For example, a portion of the light amplified by the SOA 14 is coupled from the optical waveguide 151 to the ring resonator 17-1, and light of wavelength $\lambda 3$ defined by the perimeter of the ring resonator 17-1 is transmitted to the optical waveguide 155 and incident into the PD 16-4. A portion of the light passing straight through the optical waveguide 151 is coupled to the ring resonator 17-2, and light of wavelength $\lambda 0$ defined by the perimeter of the ring resonator 17-2 is coupled to the optical waveguide 152 and incident into the PD 16-1. The same applies to $\lambda 2$ and $\lambda 1$ extracted using the ring resonators 17-3 and 17-4. The light of wavelength $\lambda 2$ is incident into the PD 16-3 from the optical waveguide 154, and light of wavelength $\lambda 1$ is incident into the PD 16-2 from the waveguide 153.

The ring resonators 17-1 to 17-4 can be designed and arranged such that the wavelengths are separated one by one starting from the edges of the wavelength band from channels with less optical loss.

<Control Flow>

Next, control flow of the optical module 10 or 10A (referred to simply as "optical module 10") is explained. There are two types of control on the optical module 10, namely, (1) control on the initial position of the center wavelength of each passband (i.e., wavelength filter) at startup, and
(2) control to keep the center wavelength of each passband to follow wavelength fluctuation of signal light during operation.

The control on the initial position of the center wavelength of each passband at startup further includes (1-a) a method of sweeping (incrementing or decrementing) over the entire range of the wavelength band to search a wavelength at which the power level of the monitor light becomes the maximum, and (1-b) a method of sweeping from an edge toward the other edge of the wavelength range and terminating the search at a position at which the power level of the monitor light has reaches a local maximum.

<Control at Startup>

Figure 4:
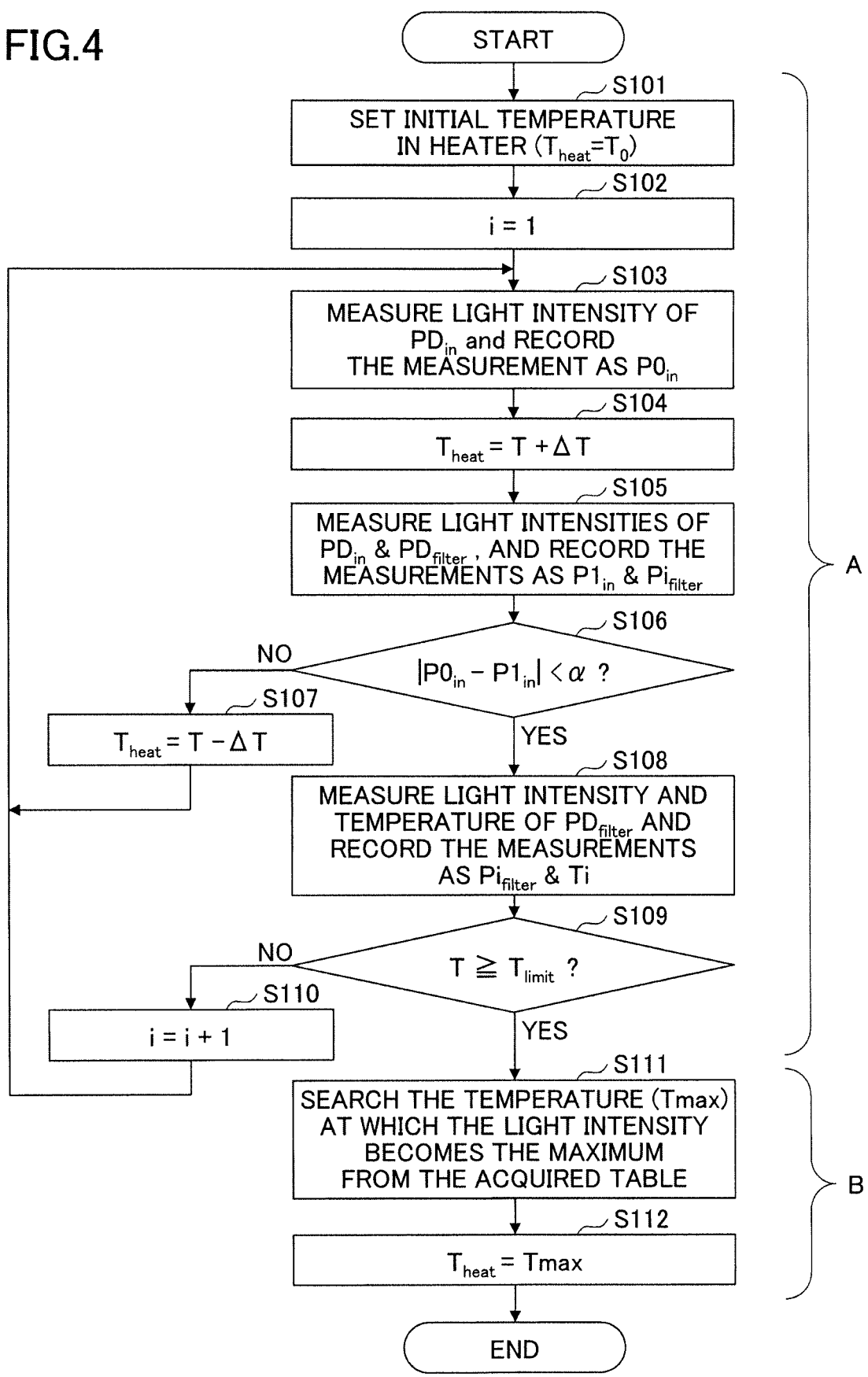
FIG. 4 is a flowchart illustrating control operations for setting an initial center wavelength at starting the module.

FIG. 4 is a flowchart illustrating control operations of center wavelength setup at startup of the optical module. This control process corresponds to the method (1-a) of full-band sweeping described above, and is executed by the control IC 20. Although FIG. 4 illustrates the control process focusing on a single wavelength output from the wavelength filter, the same control is performed on all the outputs from the respective passbands. In other words, the same control process is performed on the ring resonators 17-1 to 17-m or the heaters 19-1 to 19-m. The control process may be performed in a time-sharing manner, or it may be performed sequentially.

First, the heater temperature $T_{heat}$ is set to the initial temperature $T_0$ (S101). The number of repetitions is set to i=1 (S102). Then, the light intensity ($P0_{in}$) of the PD 12 provided at the input side of the SOA 14 is measured at the initial temperature $T_0$, and recorded in the memory 25 (S103).

Then, the heater temperature $T_{heat}$ is increased by $\Delta T$ (S104). The quantity of photodetection ($P1_{in}$) at the PD 12 of the incident side of the SOA 14, as well as the quantities of photodetection ($Pi_{filter}$) at the PDs 16 on the output side of the optical demultiplexer 15, are measured and the measurement results are recorded in the memory 25 (S105). The step size $\Delta$ of the temperature control can be selected appropriately.

Then, it is determined whether the difference between the current monitoring result $P1_{in}$ and the previous monitoring result $P0_{in}$ at the input side of the SOA 14, namely, an amount of change in the incident light, is less than a predetermined threshold value $\alpha$ (S106). When the change in the incident light monitored at the input side of the SOA 14 is smaller than the threshold $\alpha$, that is, when $|P0_{in}-P1_{in}|<\alpha$ is satisfied (YES in S106), the light intensity ($Pi_{filter}$) of the focused-on wavelength monitored by the corresponding PD 16 at the updated temperature Ti (which is T+$\Delta T$) is recorded in association with the temperature Ti in the memory 25 (S108).

Then, it is determined whether the current heater temperature T has reached the upper limit $T_{limit}$ (S109). If the current heater temperature T has not reached the upper limit $T_{limit}$ (NO in S109), "i" is incremented (S110) and steps S103 to S109 are repeated until the heater temperature reaches the upper limit.

When the heater temperature has reached the upper limit and the entire temperature range has been checked (YES in S109), the temperature $T_{max}$ at which the light intensity becomes the maximum is selected from the measurement records (S111). Then, the heater temperature is set to $T_{max}$ (S112), and the process terminates.

On the other hand, when the intensity of received light monitored at the input side of the SOA 14 varies beyond the threshold $\alpha$ (NO in S106), the temperature of the heater 19 is turned back to the previous temperature ($T_{heat}$=T-$\Delta T$) of one step earlier (S107). Then the process returns to step S103 and the intensity ($P0_{in}$) of the received light monitored at the input side is measured and recorded again. The loop of steps S103 to S107 are repeated until the change in the intensity of the received light monitored at the input side of the SOA 14 becomes smaller than the threshold $\alpha$.

The operation flow from step S101 to step S110 may be called process A for sweeping the entire temperature range of the heater 19, and the flow from step S111 to S112 may be called process B for selecting the optimum heater temperature from the entire measurement results. The operation flow of FIG. 4 is performed for each of the wavelengths to be separated, that is, for each of the heaters 19 or the ring resonators 17 to set the center wavelength of each passband of the optical demultiplexer 15 to the optimum wavelength.

In process A, the influence of an external factor such as disturbances is monitored. When the intensity of incident light into the SOA 14 has changed out of the acceptable range, tuning of the center wavelength of the filter is suspended while repeating measurement and recording of the monitoring result of the output light of the optical demultiplexer 15 at the latest temperature, until the intensity variation of the incident light falls within the acceptable range. This configuration can prevent malfunction in the startup tuning of the wavelength tunable filter.

FIG. 5 illustrates an example of the record of the measurement results saved in the memory 25 at step S108. The intensity ($Pi_{filter}$) of the output light of each wavelength of the optical demultiplexer 15 is recorded in association with the updated temperature (Ti) of the heater 19 as long as the intensity change of the incident light into the SOA 14 is within the acceptable range. By selecting the temperature at which the light intensity $Pi_{filter}$ becomes the maximum, the center wavelength of each passband of the optical demultiplexer 15 can be brought into the target wavelength, while removing the influence of disturbance.

Figure 6:
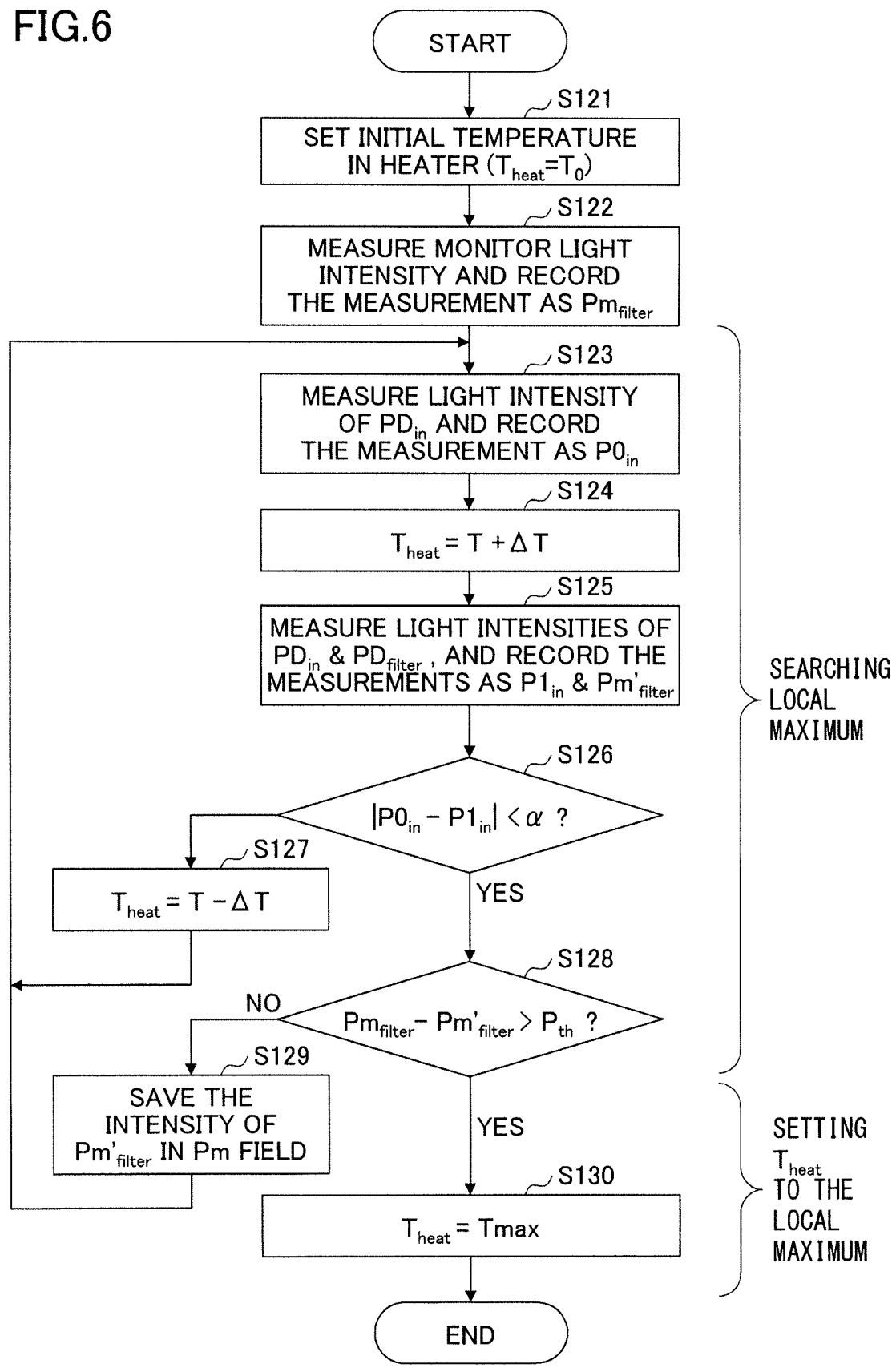
FIG. 6 is a flowchart illustrating another example of control operations for setting an initial center wavelength.

FIG. 6 is a flowchart of the method (1-b) for determining the center wavelength at the local maximum when controlling the center wavelength at the startup.

First, the heater temperature $T_{heat}$ is set to the initial temperature $T_0$ (S121). The intensity $Pm_{filter}$ of monitor light is measured at the initial temperature $T_0$ by each of the PDs 16 on the output side of the optical demultiplexer 15, and the measurement result is recorded in the memory 25 (S122). Also, at the initial temperature $T_0$, the intensity ($P0_{in}$) of the incident light is measured by the PD 12 at the input side of the SOA 14 and the measurement result is recorded in the memory 25 (S123).

Then, the heater temperature $T_{heat}$ is increased by $\Delta T$, which is expressed as $T_{heat}$=T+$\Delta T$ (S124). At the updated temperature, the intensity ($P1_{in}$) of the light monitored by the PD 12 at the input side of the SOA 14 and the intensity ($Pm'_{filter}$) of each wavelength monitored by each PD 16 at the output side of the optical demultiplexer 15 are measured and recorded (S125). The step size $\Delta$ for the temperature control can be selected appropriately.

Then, it is determined whether the difference between the current monitoring result $P1_{in}$ and the previous monitoring result $P0_{in}$ at the input side of the SOA 14 is less than a predetermined threshold value $\alpha$ (S126). When the change in the incident light monitored at the input side of the SOA 14 is equal to or greater than the threshold $\alpha$, that is, when $|P0_{in}-P1_{in}|<\alpha$ is not satisfied (NO in S126), it is judged that the influence of disturbance is significant. In this case, the heater temperature $T_{heat}$ is changed by -$\Delta T$ in the direction returning to the previous temperature (S127), and steps 124 to 126 are repeated until the influence of the disturbance converges into the acceptable range.

When the change in the incident light monitored at the input side of the SOA 14 is smaller than the threshold $\alpha$, that is, when $|P0_{in}-P1_{in}|<\alpha$ is satisfied (YES in S126), it is judged that the influence of disturbance is within the acceptable range, and the process proceeds to determination of intensity change at the output side of the optical demultiplexer 15 (S128).

In step S128, it is determined whether the current monitoring result Pm'$_{filter}$ has decreased from the previous monitoring result Pm$_{filter}$ by an amount exceeding a threshold P$_{th}$. When the amount of power decrease in the monitor light does not exceed the threshold P$_{th}$ (NO in S128), it means that the center wavelength of the passband is approaching or resides near the target wavelength. In this case, the current monitoring result Pm'$_{filter}$ is saved as Pm in association with the temperature T$_{heat}$ in the memory 25 (S129).

Steps S123 to S129 are repeated until the current power level monitored by PD 16 has declined greatly over the threshold P$_{th}$ (YES in S128). When the current power level monitored by PD 16 has decreased greatly over the threshold P$_{th}$, then T$_{heat}$ is set to T$_{max}$ at which the power level has reached the local maximum (S130) and the process terminates.

This method is also capable of controlling the center wavelength of each passband of the optical demultiplexer 15 to the optimum position taking into account external factors such as the influence of disturbance.

<Follow-Up Control during Operation>

FIG. 7A to FIG. 7F illustrate a concept of the above-described control (2) for making the center wavelength of each passband follow wavelength fluctuation of signal light during operation. In the initial state of FIG. 7A, the wavelength of the transmitted signal light "S" has slightly shifted toward a longer wavelength from the center of the passband of the wavelength filter "F". In other words, the center wavelength of the wavelength filter is away from the signal wavelength toward a shorter wavelength. Even though initial control is performed to bring the transmission characteristics of the optical demultiplexer 15 to be consistent with the wavelengths of the WDM signal at the startup, the center wavelength of a wavelength filter may diverge from the corresponding signal wavelength due to fluctuation in the light source wavelength due to temperature change, fluctuation in the transmission characteristics of the optical demultiplexer 15, and so on. In the embodiment, a narrowband filter is achieved by controlling the transmission characteristics of the optical demultiplexer 15 so as to follow wavelength fluctuation of signal light during operation.

Figure 7A:
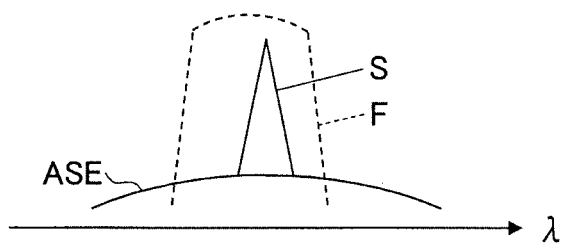
FIG. 7A illustrates a concept of controlling a wavelength tunable filter in operation.
Figure 7B:
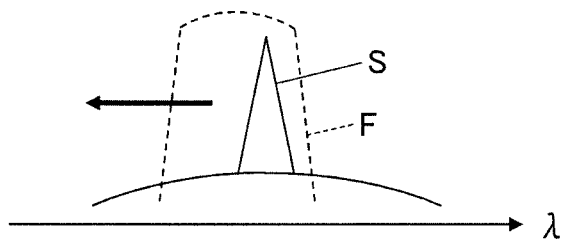
FIG. 7B illustrates a concept of controlling a wavelength tunable filter in operation.

The direction of control from the initial state of FIG. 7A is unknown. Therefore, the center wavelength of the passband of the wavelength filter is shifted in one direction, for example, toward shorter wavelengths, as illustrated in FIG. 7B. The center wavelength can be shifted by controlling the temperature of the heater 19 provided for the ring resonator 17, for example.

The temperature of the heater 19 is raised at a constant step size to move the center wavelength of the wavelength filter to the shorter side, and the power level of the transmitted light through the wavelength filter (i.e., one of the output lights from the optical demultiplexer 15) is monitored.

Figure 7C:
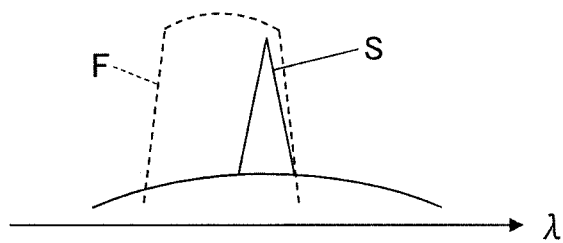
FIG. 7C illustrates a concept of controlling a wavelength tunable filter in operation.

In FIG. 7C, because the intensity of the transmitted light through the wavelength filter has declined according to the monitoring result, the control in that direction is stopped and the control direction is switched. The fall of the intensity of the transmitted light indicates that the center wavelength of the passband of the filter is away from the wavelength of the transmitted signal light.

Figure 7D:
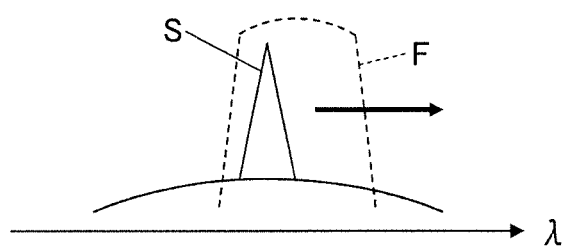
FIG. 7D illustrates a concept of controlling a wavelength tunable filter in operation.
Figure 7E:
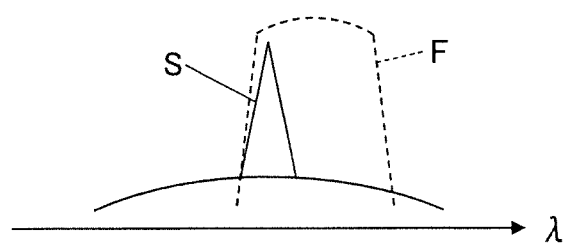
FIG. 7E illustrates a concept of controlling a wavelength tunable filter in operation.
Figure 7F:
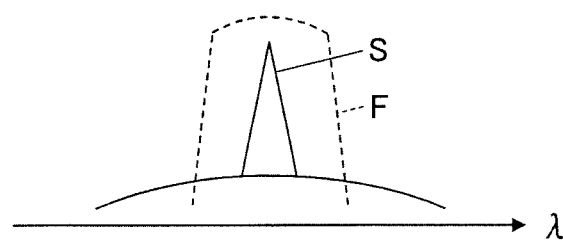
FIG. 7F illustrates a concept of controlling a wavelength tunable filter in operation.

In FIG. 7D, by raising the heater temperature, the center wavelength of the wavelength filter is shifted to the longer side and the intensity of monitor light is measured. In FIG. 7E, the intensity of the monitor light transmitted through the wavelength filter has fallen, and accordingly, control in this direction is stopped. By switching the control direction again upon detection of the decline in the intensity of the monitor light, the center wavelength of the passband of the wavelength filter converges to the wavelength of the transmitted signal light. In FIG. 7F, the temperature at which the intensity becomes the maximum is selected as the heater temperature from among the recorded measurements.

Figure 8:
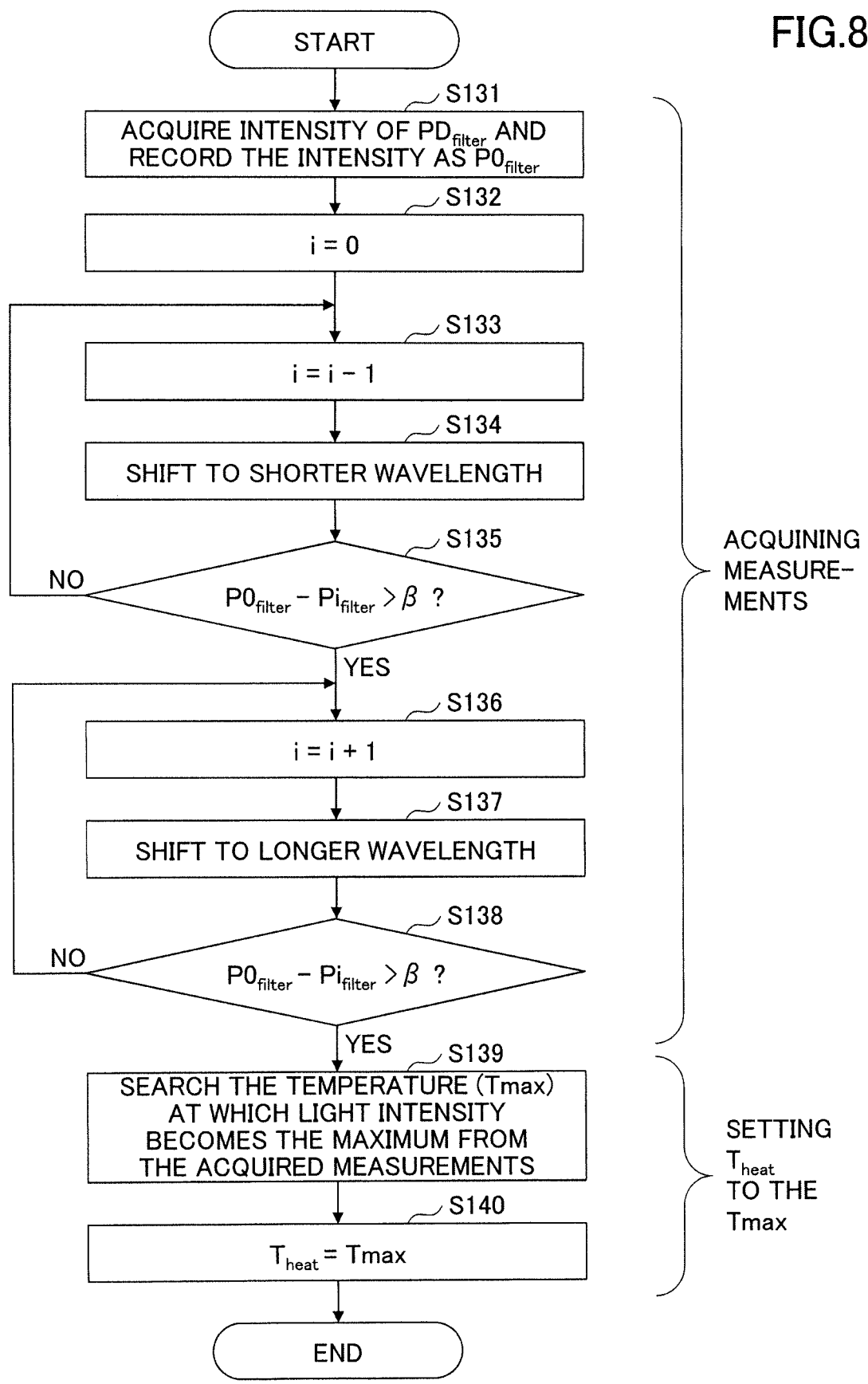
FIG. 8 is a flowchart illustrating an example of operation flow implementing the concept of FIG. 7A to FIG. 7F.

FIG. 8 is a flowchart of control operations implementing the concept illustrated in FIG. 7A to FIG. 7F. This control flow is performed by the control IC 20 on all the filter outputs. First, in the initial state, the intensity of light monitored by a focused-on PD 16 (denoted as PD$_{filter}$ in the figure) is acquired at the output side of the optical demultiplexer 15 and recorded as P0$_{filter}$ (S131). The wavelength position i of the wavelength filter at this time is used as the initial position (i=0) (S132).

The wavelength position i is decremented to i-1, one-step shifting toward a shorter wavelength (S133), and the center wavelength of the wavelength filter is shifted to a shorter side (S134). Detailed operations of step S134 will be described later with reference to FIG. 9.

After the shifting of the center wavelength of the wavelength filter by the predetermined step size, the intensity Pi$_{filter}$ of monitor light is acquired from the corresponding PD 16, and it is determined whether the condition P0$_{filter}$-Pi$_{filter}$>β is satisfied (S135). If this condition is not satisfied (NO in S135), it means that the current intensity Pi$_{filter}$ of the monitor light is still acceptable and that the amount of change from the initial intensity P0$_{filter}$ of the monitor light does not exceed the threshold β. In this case, steps S133 to S135 are repeated in the same direction. The threshold β used for determination of fluctuation of the transmitted light may be the same as or different from the threshold a used in FIG. 6.

When the condition P0$_{filter}$-Pi$_{filter}$>β is satisfied (YES in S135), the intensity of the monitor light has fallen from the initial value out of the acceptable range, and the control direction is switched to the reverse, setting the position i to i=i+1 (S136). The center wavelength of the wavelength filter is controlled so as to shift toward a longer wavelength (S137). Detailed operations of step S137 will be described later with reference to FIG. 10.

After the shifting of the center wavelength of the wavelength filter to the longer side, the intensity Pi$_{filter}$ of monitor light is acquired from the corresponding PD 16, and it is determined whether the condition P0$_{filter}$-Pi$_{filter}$>β is satisfied (S138). When the condition is not satisfied (NO in S138), steps S136 to S138 are repeated in the same control direction.

When the condition P0$_{filter}$-Pi$_{filter}$>β is satisfied in step S138, it means that the intensity of the monitor light has fallen out of the acceptable range even in the opposite direction. In this case, the temperature T$_{max}$ at which the light intensity is the maximum is searched from among the acquired measurements (S139). The heater temperature T$_{heat}$ is set to T$_{max}$ (S140) and the process terminates.

The flow from S131 to S138 is a process of collecting measurements in order for setting the center of the wavelength filter to the optimum position in the later process. The flow from S139 to S140 is a process of selecting the center wavelength of the wavelength filter at which the intensity of the monitor light becomes the maximum.

Figure 9:
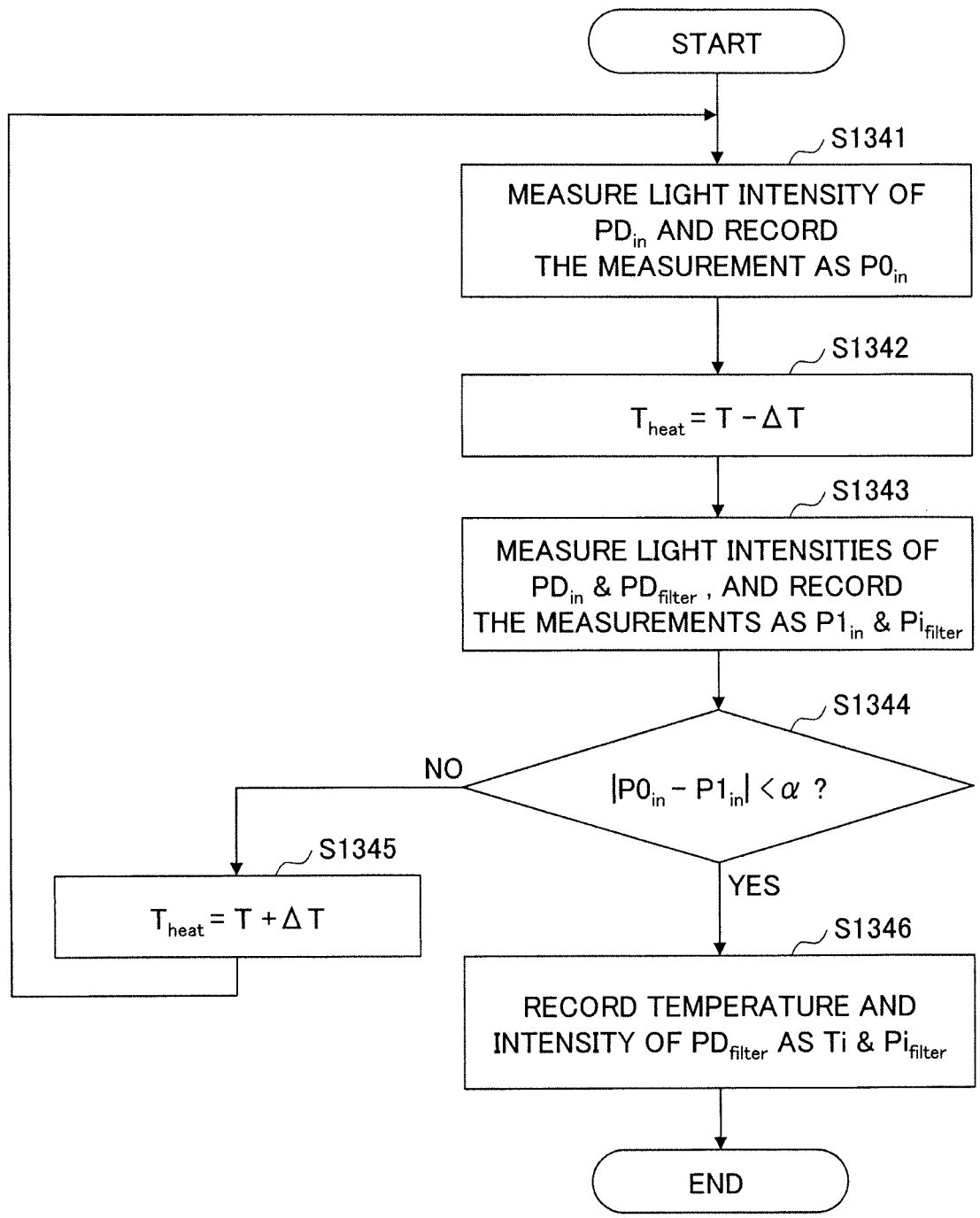
FIG. 9 illustrates a detailed flow of center wavelength shifting control toward shorter wavelengths (S134) of FIG. 8.

FIG. 9 illustrates detailed operations of step S134 (shift to a short wavelength) of FIG. 8. At the input side of the SOA 14, the intensity P0$_{in}$ monitored by PD 12 (denoted as PD$_{in}$ in the figure) is measured and recorded in the memory 25 (S1341).

Then, the heater temperature $T_{heat}$ of the ring resonator 17 for the focused-on wavelength is lowered by $\Delta T$ (S1342), and at the updated temperature, the intensity (P1$_{in}$) of the input light monitored by the PD 12, as well as the intensity (Pi$_{filter}$) of the wavelength monitored by the associated PD 16 (denoted as PD$_{filter}$ in the figure) at the output side of the optical demultiplexer 15, are acquired and recorded associated with the heater temperature in the memory 25 (S1343).

Then, it is determined whether the difference or the amount of change (|P0$_{in}$-P1$_{in}$|) between the current monitoring result P1$_{in}$ and the previous monitoring result P0$_{in}$ at the input side of the SOA 14 is less than a predetermined threshold $\alpha$ (S1344). When |P0$_{in}$-P1$_{in}$|<$\alpha$ is satisfied (YES in S1344), there is no influence of disturbance or it is negligible, and accordingly, the light intensity (Pi$_{filter}$) of the focused-on wavelengths monitored by the corresponding PD 16 is recorded together with the temperature Ti (S1346). Then, the process proceeds to step S135 of FIG. 8.

When in step S1344 |P0$_{in}$-P1$_{in}$|<$\alpha$ is not satisfied, the influence of disturbance is significant, and accordingly, the heater temperature is increased by $\Delta T$ back to the previous temperature (S1345). Then steps S1341 to S1344 are repeated until the influence of disturbance has diminished to the acceptable level (YES in S1344). Once the influence of disturbance is settled, the measurement of the transmitted light of the focused-on wavelength and the associated temperature are recorded (S1346).

Figure 10:
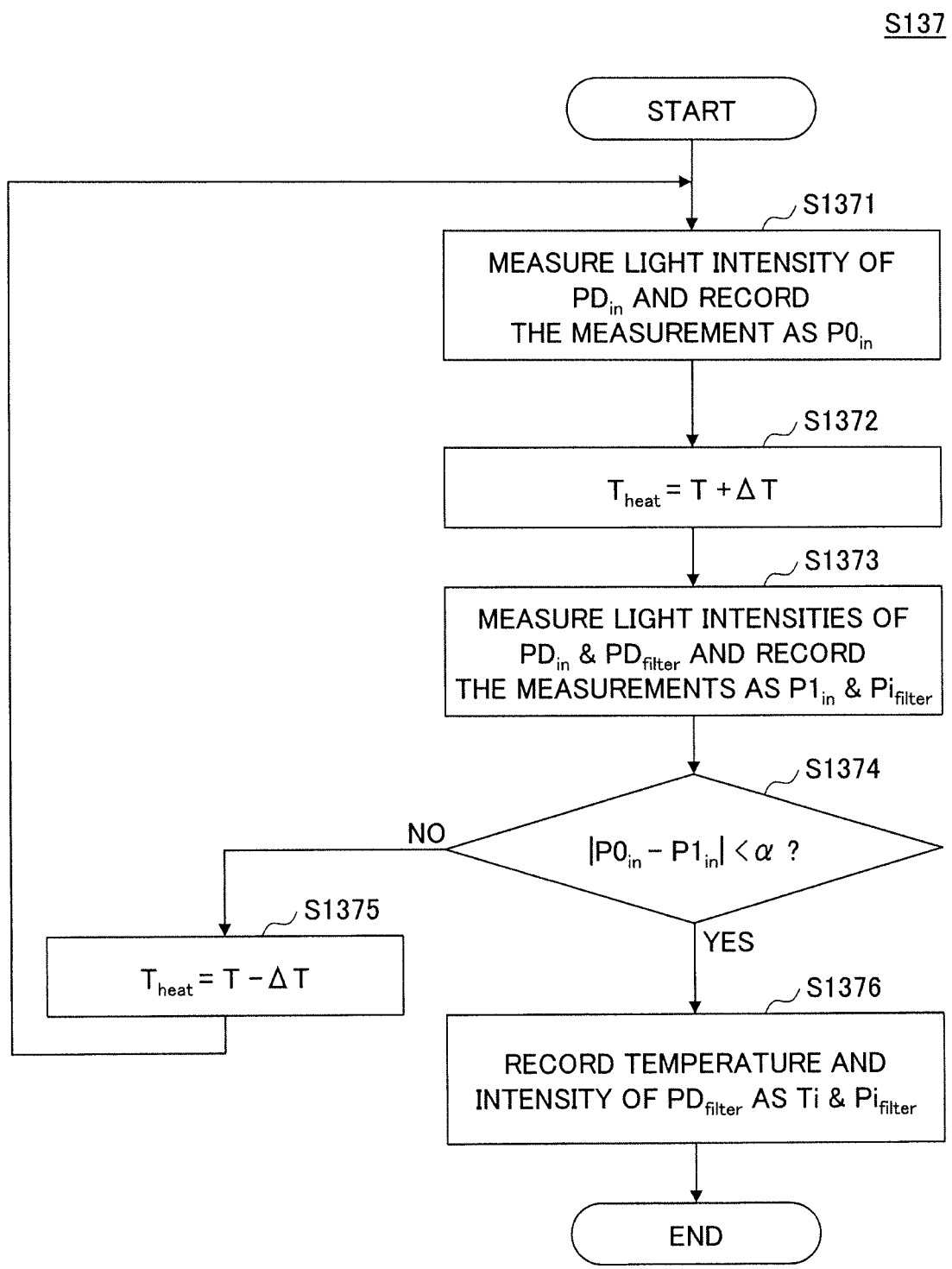
FIG. 10 illustrates a detailed flow of center wavelength shifting control toward longer wavelengths (S137) of FIG. 8.

FIG. 10 illustrates detailed operations of step S137 (shift to a longer wavelength) of FIG. 8. At the input side of the SOA 14, the intensity P0$_{in}$ monitored by PD 12 (denoted as PD$_{in}$ in the figure) is measured and recorded in the memory 25 (S1371). Then, the heater temperature $T_{heat}$ of the ring resonator 17 for the focused-on wavelength is raised by $\Delta T$ (S1372), and at the updated temperature, the intensity (P1$_{in}$) of the input light monitored by the PD 12, as well as the intensity (Pi$_{filter}$) of the wavelength monitored by the associated PD 16 (denoted as PD$_{filter}$ in the figure) at the output side of the optical demultiplexer 15, are acquired and recorded in association with the heater temperature in the memory 25 (S1373).

Then, it is determined whether the difference or the amount of change between the current monitoring result P1$_{in}$ and the previous monitoring result P0$_{in}$ at the input side of the SOA 14 is less than a predetermined threshold a, namely, whether |P0$_{in}$-P1$_{in}$|<$\alpha$ is satisfied (S1374). When the condition of S1374 is not satisfied, the influence of disturbance is significant, and accordingly, the heater temperature is lowered by IT to turn back to the previous temperature (S1375). Then steps S1371 to S1374 are repeated. When the condition |P0$_{in}$-P1$_{in}$|<$\alpha$ is satisfied (YES in S1374), the light intensity Pi$_{filter}$ of the monitor light of the focused-on wavelength from the corresponding PD 16 is recorded associated with the temperature Ti (S1376). Then, the process proceeds to step S138 of FIG. 8.

In this manner, the intensity or the power of the light incident into the SOA 14 is monitored when adjusting the center wavelength of the wavelength filter. Upon occurrence of a significant change in the intensity of the incident light between before and after the adjustment (shifting) of the center wavelength, control on the center wavelength is suspended until the influence of disturbance is settled. With this configuration, the passband of the wavelength filter can be narrowed so as to reduce ASE noise, and the quality of optical communication can be maintained.

FIG. 11A to FIG. 11E illustrate a concept of another example of control on the wavelength filter during operation. With this scheme, the center wavelength of the wavelength filter is shifted from the initial position at a step size of $\Delta\lambda$ toward a longer wavelength or a shorter wavelength, while monitoring the intensity of the transmitted light, to select the direction in which the intensity of the monitor light increases, thereby bringing the center wavelength of the wavelength filter to be closer to the wavelength of the transmitted light.

Figure 11A:
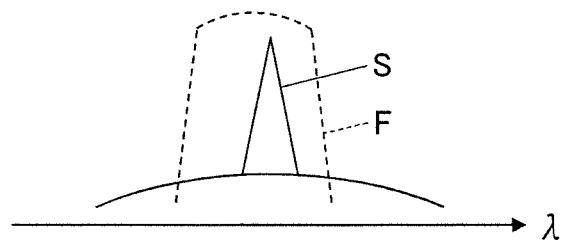
FIG. 11A illustrates a concept of another example of controlling a wavelength tunable filter in operation.

In the initial state of FIG. 11A, the wavelength of the transmitted light (which is denoted as "S" in the figure) is slightly away from the center of the passband of the wavelength filter (which is denoted as "F" in the figure) toward a longer wavelength. In other words, the center wavelength of the wavelength filter is shifted toward a shorter wavelength from the wavelength of the transmitted light.

Figure 11B:
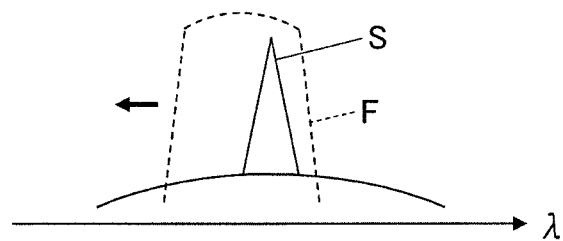
FIG. 11B illustrates a concept of another example of controlling a wavelength tunable filter in operation.
Figure 11C:
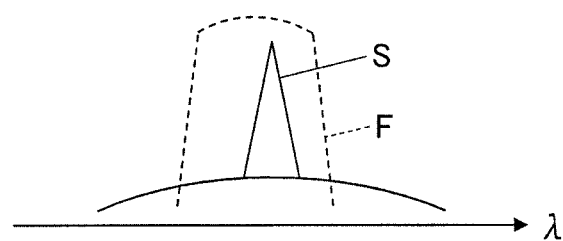
FIG. 11C illustrates a concept of another example of controlling a wavelength tunable filter in operation.

Since the direction of control from the initial state of FIG. 11A is unknown, the center wavelength of the passband of the wavelength filter is shifted in one direction, for example, toward shorter wavelengths as illustrated in FIG. 11B. In FIG. 11C, because the intensity of the light having transmitted through the wavelength filter has fallen according to the monitoring result, the center wavelength of the wavelength filter is shifted by $\Delta\lambda$ toward a longer wavelength so as to bring the center wavelength back to the original position.

Figure 11D:
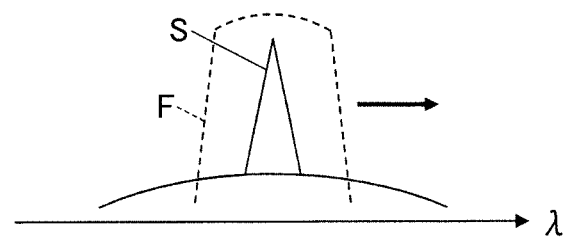
FIG. 11D illustrates a concept of another example of controlling a wavelength tunable filter in operation.
Figure 11E:
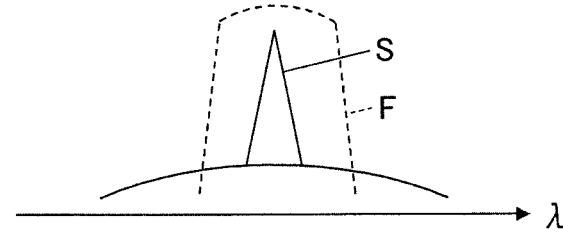
FIG. 11E illustrates a concept of another example of controlling a wavelength tunable filter in operation.

Then in FIG. 11D, the center wavelength of the wavelength filter is shifted by $\Delta\lambda$ further to a longer wavelength. In FIG. 11E, because the intensity of the monitor light transmitted through the wavelength filter has increased, the adjustment of the center wavelength is terminated. The control illustrated in FIG. 11A to FIG. 11E may be carried out at a predetermined time interval during operation so as to make the center wavelength of the wavelength filter follow wavelength fluctuation.

Figure 12A:
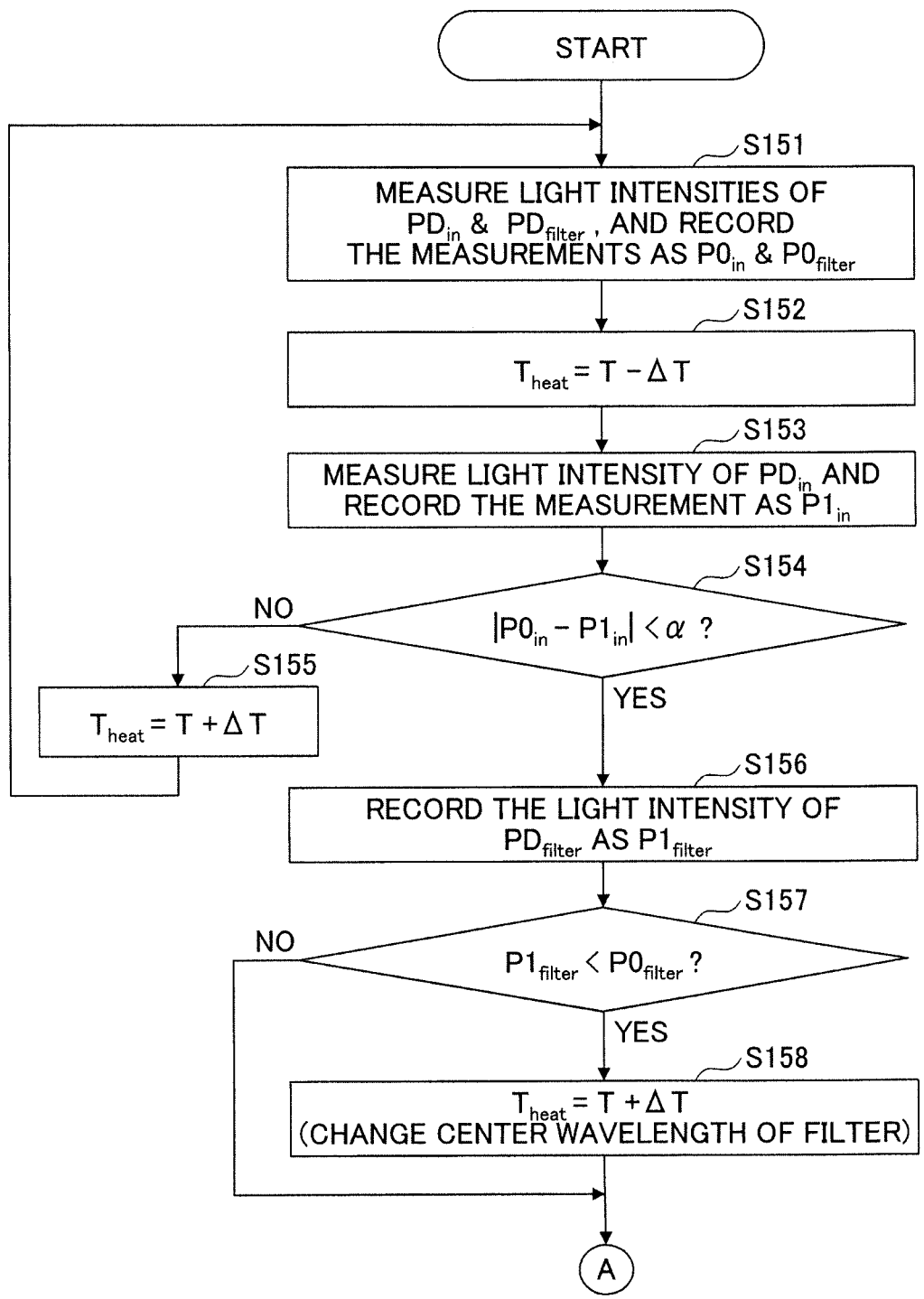
FIG. 12A is a flowchart illustrating an example of operation flow implementing the concept of FIG. 11A to FIG. 11E.
Figure 12B:
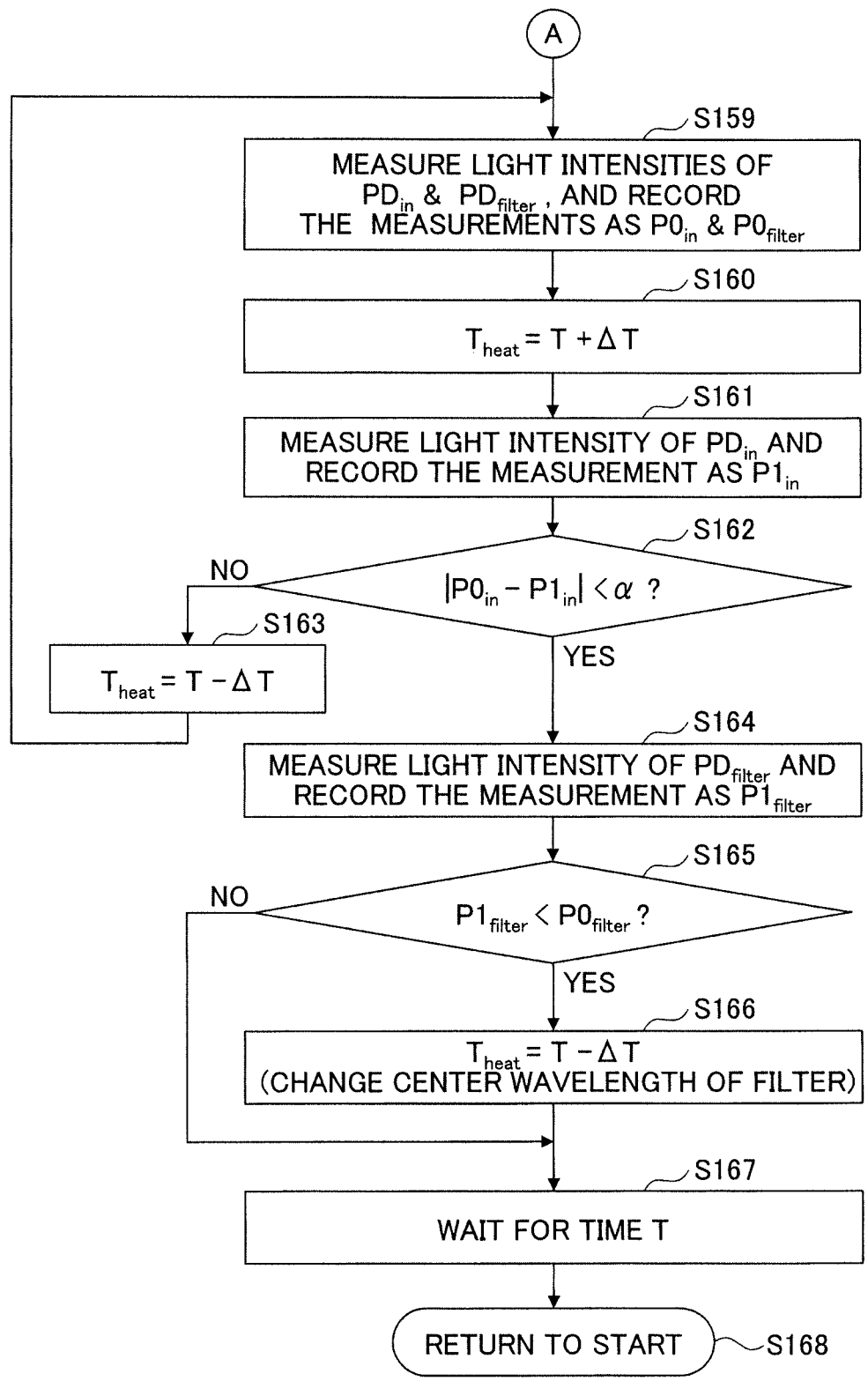
FIG. 12B is a flowchart illustrating an example of operation flow implementing the concept of FIG. 11A to FIG. 11E, continued from point A of FIG. 12A.

FIG. 12A and FIG. 12B are flowcharts illustrating a control process implementing the concept illustrated in FIG. 11A to FIG. 11E. This control process is performed by the control IC 20 on all the filter outputs. First, the intensity of the incident light monitored by PD 12 (denoted as PD$_{in}$ in the figure) at the input side of the OSA 14 and the intensity of transmitted light monitored by a focused-on PD 16 (denoted as PD$_{filter}$ in the figure) at the output side of the optical demultiplexer 15 are acquired and recorded as P0$_{in}$ and P0$_{filter}$, respectively (S151).

Then, the center wavelength of the focused-on wavelength filter (in this example, the focused-on ring resonator 17) is shifted by $\Delta\lambda$ toward a shorter wavelength. This operation is achieved by lowering the temperature of the corresponding heater 19 by $\Delta T$ (S152). The updated heater temperature $T_{heat}$ is represented as T-$\Delta T$.

At the updated temperature, the intensity of light incident into the SOA 14 is measured and recorded as P1$_{in}$ (S153). Then, it is determined whether the condition |P0$_{in}$ P1$_{in}$|<$\alpha$ is satisfied (S154). When the condition of S154 is not satisfied (NO in S154), it means that the current intensity of the incident light has varied significantly over the threshold $\alpha$. In this case, the heater temperature is raised by $\Delta T$ to bring the center wavelength of the wavelength filter back to the previous position (S155), and steps S151 to S154 are repeated until the condition of S154 is satisfied.

When |P0$_{in}$-P1$_{in}$|<$\alpha$ is satisfied in step S154, which means that the influence of disturbance is negligible, the intensity of the transmitted light through the wavelength filter is measured at the updated temperature (after the $\Delta\lambda$ shifting) and the measurement P1$_{filter}$ is recorded (S156).

Then it is determined whether the intensity P1$_{filter}$ of the transmitted light acquired after the shifting of $\Delta\lambda$ is lower than the intensity P0$_{filter}$ of the transmitted light acquired before the $\Delta\lambda$ shifting, that is, whether $P1_{filter} < P0_{filter}$ is satisfied (S157). If this condition is satisfied (YES at S157), the heater temperature is raised by $\Delta T$ to bring the center wavelength of the wavelength filter back to the original position (S158) and then, the process proceeds to step S159 of FIG. 12B. When the intensity of the transmitted light has not fallen in step S157 (NO at S157), the process proceeds directly to step S159.

In step S159, the intensity of light monitored by the PD 12 (denoted as $PD_{in}$) and the intensity of light monitored by the PD 16 (denoted as $PD_{filter}$) are acquired and recorded as $P0_{in}$ and $P0_{filter}$, respectively. The center wavelength of the focused-on wavelength filter is shifted by $\Delta\lambda$ in the reverse direction, that is, toward a longer wavelength. This is achieved by, for example, raising the temperature of the heater 19 provided for the focused-on ring resonator 17 by $\Delta T$ (S160).

The intensity of the incident light to the SOA 14 is measured at the updated temperature to acquire $P1_{in}$ (S161), and it is determined whether the incident light satisfies the condition $|P0_{in} - P1_{in}| < \alpha$ (S162). When the condition is not satisfied (NO in S162), it means that the intensity of the incident light fluctuates significantly over the threshold $\alpha$, and accordingly, the heater temperature is lowered by $\Delta T$ to bring the center wavelength of the wavelength filter back to the original position. (S163). Steps S159 to S162 are repeated until the condition of step S162 is satisfied.

When the condition $|P0_{in} - P1_{in}| < \alpha$ is satisfied in step S162, the influence of disturbance has become negligible, and accordingly, the intensity $P1_{filter}$ of the light transmitted through the wavelength filter is acquired at the updated temperature (S164). Then it is determined whether $P1_{filter} < P0_{filter}$ is satisfied (S165). If this condition is satisfied (YES in S165), the heater temperature is decreased by $\Delta T$ so as to bring the center wavelength of the wavelength filter back to the original position (S166). Then the process waits for the next cycle (S167). When in step S165 the monitored intensity of the transmitted light has not fallen, the process proceeds directly to step S167 and waits for time t until the next cycle.

With this method, the transmission characteristic of the optical demultiplexer 15 follows the wavelength fluctuation of the signal light during operation of the optical module 10, and a narrowband filter with a passband width of 1 nm to 3 nm can be achieved. With the narrow passband of the wavelength filter, ASE noise can be reduced and the quality of optical communication is maintained satisfactory.

Second Embodiment

Figure 13:
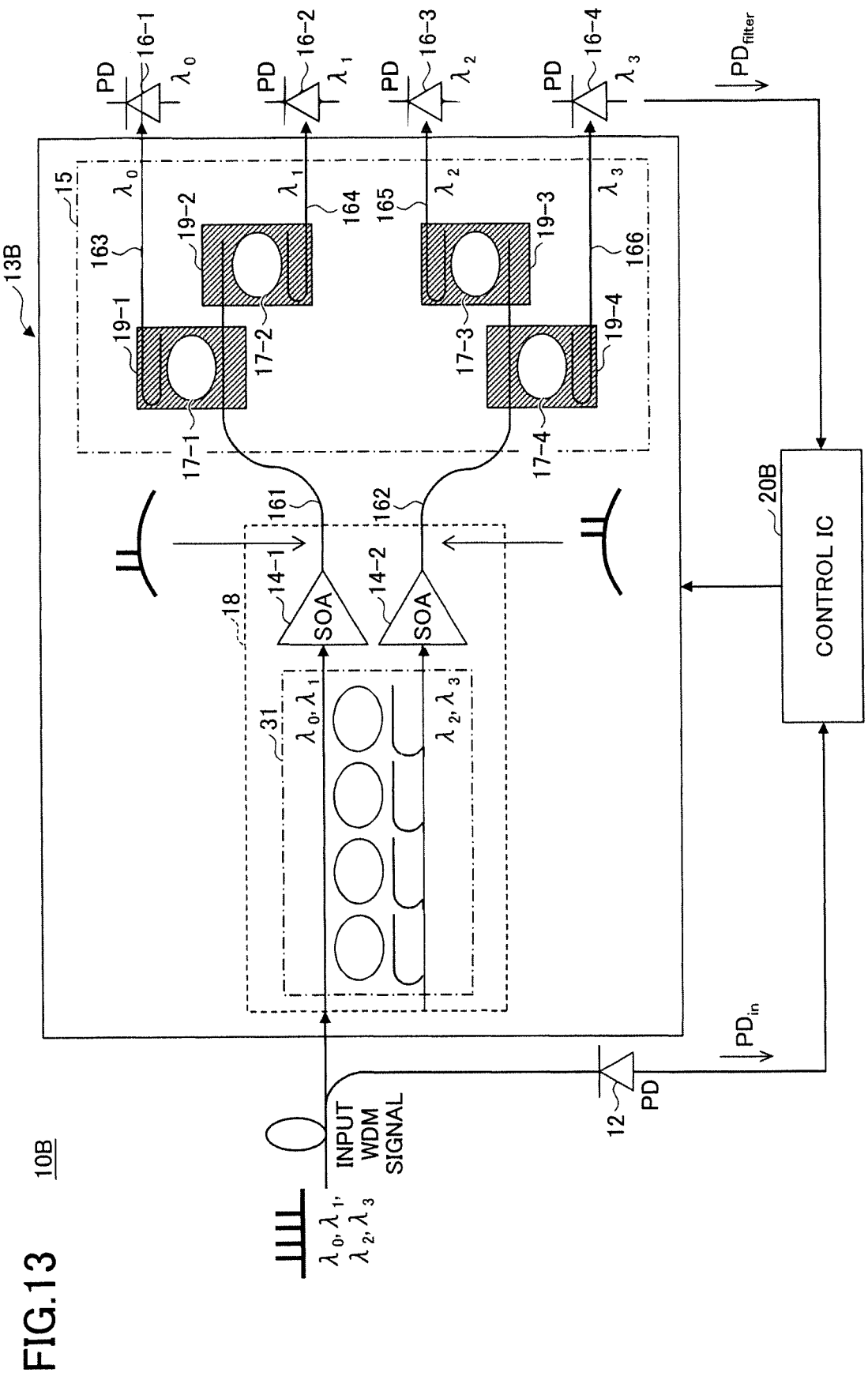
FIG. 13 is a schematic diagram of an optical module according to a second embodiment.

FIG. 13 is a schematic diagram of an optical module 10B according to the second embodiment. In the optical module 10B, the received WDM signal is split into a shorter wavelength part and a longer wavelength part, prior to optical amplification. The split light portions are guided to SOA 14-1 and SOA 14-2, respectively, which have different amplification characteristics. Because the number of wavelengths entering each SOA becomes half, the bandwidths of the SOA 14-1 and the SOA 14-2 can be reduced.

The optical module 10B has a wavelength separation platform 13B, a control IC 20B, a PD 12, and PDs 16-1 to 16-m (m=4 in this example). A VOA 11 (see FIG. 2) may be provided upstream of the wavelength separation platform 13B.

The wavelength separation platform 13B has a wavelength filter 31, a SOA 14-1, a SOA 14-2, and an optical demultiplexer 15, which are provided on a same substrate.

The optical demultiplexer 15 may be named a first wavelength filter, and the wavelength filter 31 may be named a second wavelength filter. The wavelength filter 31, the SOA 14-1, and the SOA 14-2 may be under the temperature control by the TEC 18.

The wavelength filter 31 supplies, for example, shorter-side wavelengths ($\lambda 0$ and $\lambda 1$) to the SOA 14-1 and supplies, for example, longer-side wavelengths ($\lambda 2$ and $\lambda 3$) to the SOA 14-2, among the wavelengths ($\lambda 0$, $\lambda 1$, $\lambda 2$, and $\lambda 3$ in the example of FIG. 13) contained in the incident light. In the configuration of FIG. 13, an array of ring resonators is used as the wavelength filter 31. The present invention is not limited to this example, and the wavelength filter 31 may be formed of an arrayed waveguide grating (AWG).

The light components collectively amplified by the SOA 14-1 travel through the optical waveguide 161. Wavelength $\lambda 0$ is selected by the ring resonator 17-1, and incident into the PD 16-1 from the optical waveguide 163. Wavelength $\lambda 1$ travelling straight through the optical waveguide 161 is selected by the ring resonator 17-2 and incident into the PD 16-2 from the optical waveguide 164.

The light components collectively amplified by the SOA 14-2 travel through the optical waveguide 162. Wavelength $\lambda 3$ is selected by the ring resonator 17-4, and incident into the PD 16-4 from the optical waveguide 166. Wavelength $\lambda 2$ travelling straight through the optical waveguide 162 is selected by the ring resonator 17-3 and incident into the PD 16-3 from the optical waveguide 165.

Each of the light components received by the PDs 16-1 to 16-4 is power-detected by the control IC 20B. On the other hand, a portion of the incident light is branched at the input side of the wavelength separation platform 18 and received by the PD 12. The output $PD_{in}$ from the PD 12 is power-detected by the control IC 20B, and is used to control the center wavelength of each passband of the optical demultiplexer 15.

As in the first embodiment, the output from the PD 12 is used to control the center wavelength of the passband of each wavelength filter (in this example, each ring resonator) both at startup and during operation. The center wavelength of each wavelength filter can follow the wavelength fluctuation of signal light accurately, reducing adverse influence of external disturbance on the incident light. Even with as narrow a passband as about 1 nm for the ring resonators 17-1 to 17-4 of the optical demultiplexer 15, error determination in the wavelength follow-up control or failure in optical communication due to signal deviation from the passband can be prevented can be prevented or reduced.

With the configuration of FIG. 13, even when the gain bandwidth amplifiable by the SOAs 14-1 and SOA 14-2 is small, wavelength division multiplexing is implemented over a broad wavelength range using a plurality of SOAs 14. Compared with the configuration of the first embodiment, the second wavelength filter 31 is inserted in the front stage of the SOA 14. Because the size of the wavelength filter 31 fabricated by silicon photonics technology is sufficiently small, there is little influence on the size of the optical module 10B.

The second wavelength filter 31 which roughly splits the wavelength band of the incident light is not limited to the configuration using multiple ring resonators, and instead, an arrayed waveguide grating (AWG) may be used. Rough split of the wavelength band in the first stage is not limited to splitting into two wavelength groups, and the incident light may be split into three or more wavelength groups. Each of the split light contains two or more wavelengths and is amplified collectively by a corresponding one of SOAs. The number of SOAs used is consistent with the number of wavelength groups split by the wavelength filter 31.

The number of wavelengths multiplexed into the incident light is not limited to 4, and a WDM signal with any number of wavelengths (m wavelengths) multiplexed can be handled. For example, a WDM signal with 16 wavelengths multiplexed may be roughly split into four portions such that each light portion contains two or more wavelengths, and each of the split light portions may be amplified collectively by a corresponding SOA 14. Then, each of the wavelengths can be separated by and output from the optical demultiplexer 15 optically connected to each of the SOAs 14.

<Another Example of Optical module>

Figure 14:
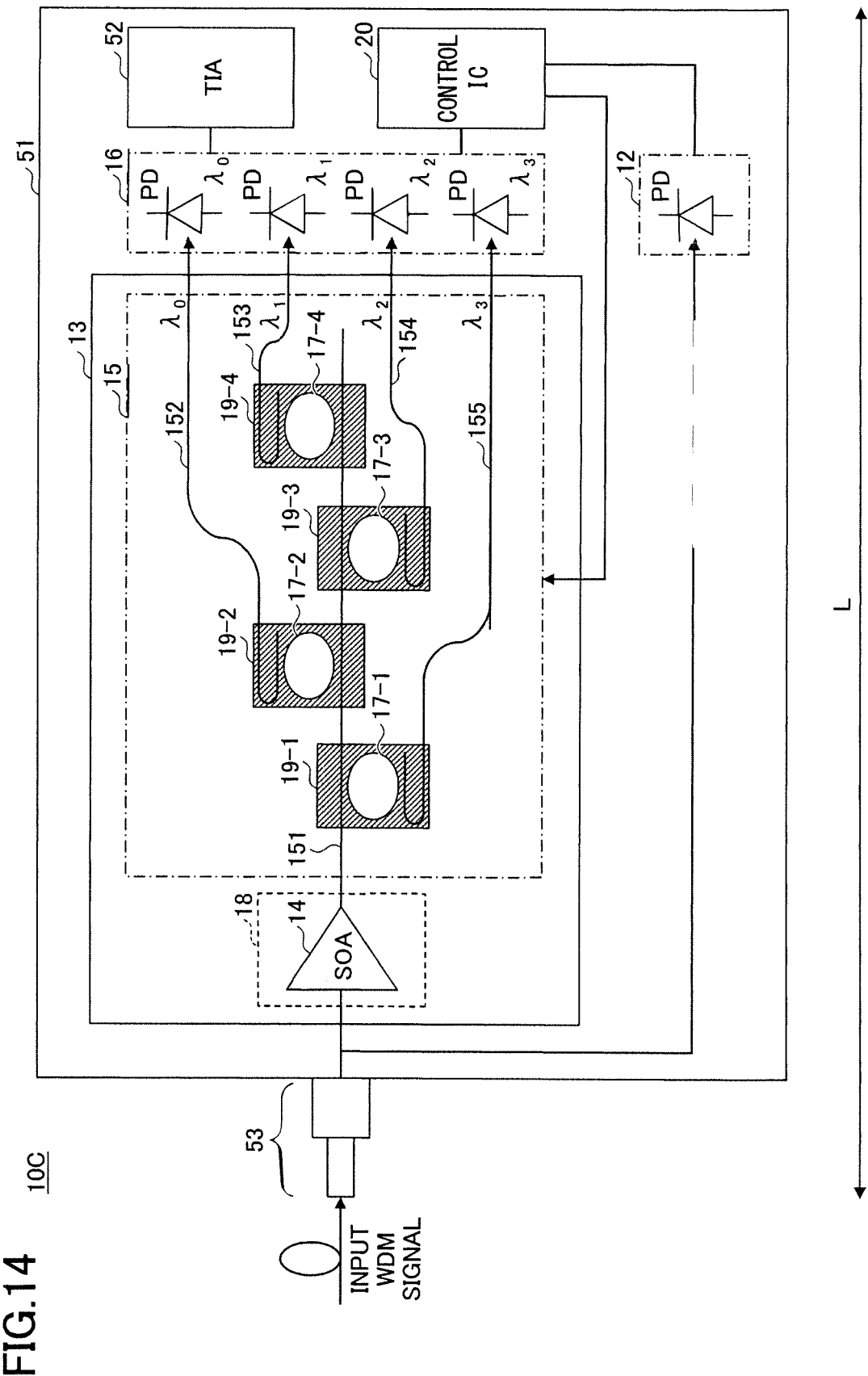
FIG. 14 illustrates an example of a packaged optical module.

FIG. 14 is a schematic diagram of a packaged optical module 100. In the optical module 100, a wavelength separation platform 13 with a built-in SOA 14, a PD 12 that monitors incident light to the SOA 14, a plurality of PDs 16, a control IC 20, and an electric circuit 52 including a transimpedance amplifier (TIA) are arranged in a package 51.

The wavelength separation platform 13 has an optical demultiplexer 15 and a SOA 14 formed by silicon photonics technology and provided on the same substrate, and it can be downsized with a lensless configuration. Even when the length along the optical axis of the space for housing the plurality of PDs 16, the electric circuit 52, and the control IC 20 is about 5 mm, the total length L of the optical module 13C, including the receptacle 53, is 20 mm or less.

With the center wavelength tunable control described above, the passband width of the optical demultiplexer 15 can be designed to be about 3 nm or even 1 nm, and the ASE noise caused by collective amplification can be removed sufficiently.

FIG. 15 illustrates an advantageous effect of the embodiment. Because in the embodiment, the passband width of the optical demultiplexer 15 can be narrowed to 1 nm to 3 nm by controlling the center wavelength of the wavelength filter, ASE light noise generated by collective amplification of the incident light can be reduced as illustrated in FIG. 15.

The leftmost diagram of FIG. 15 represents a bit error rate (BER) of a conventional demultiplexer (DEMUX) using a combination of a dielectric multilayer film and a mirror. The bandwidth of the conventional demultiplexer is about 7 nm. The center diagram represents the BER of the optical demultiplexer 15 of the embodiment with a filter passband of 3 nm, and the rightmost diagram represents the BER of the optical demultiplexer 15 of the embodiment with a filter bandwidth of 1 nm.

It is understandable that the BER is reduced by narrowing the passband width with respect to the incident signal light with the same optical signal-to-noise ratio (OSNR). The current practical range of OSNR is 17 to 18 dB. The conventional filter with a bandwidth of 7 nm has little margin for BER. When designing the passband width of 3 nm, the BER can be reduced by one digit compared with the conventional configuration, with respect to the same received optical signal with OSNR of 18 dB. When designing the passband width of 1 nm, the BER is reduced by two digits compared with the conventional configuration.

The invention is not limited to those embodiments described above, but includes various modifications and substitutions. For example, the center wavelength of each wavelength filter of the optical demultiplexer 15 may be controlled by changing the index of refraction making use of a carrier-induced effect by current injection, in place of heater control.

Figure 16A:
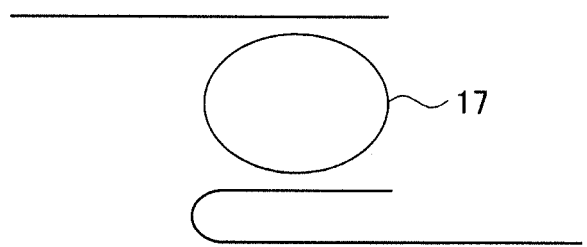
FIG. 16A illustrates a modification of a ring filter.
Figure 16B:
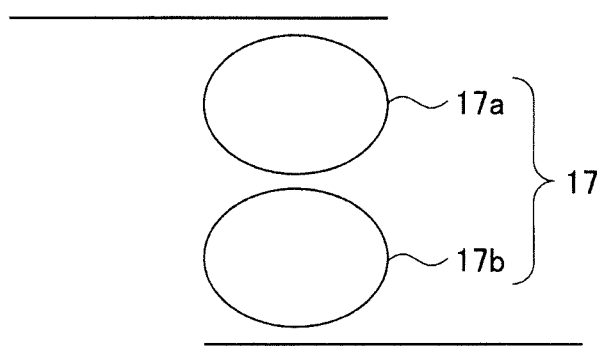
FIG. 16B illustrates another modification of a ring filter.

In the embodiment, although a ring filter is formed with a ring resonator 17 for convenience sake of illustration as illustrated in FIG. 16A, two or more ring resonators 17a and 17b may be used to form a ring filter as illustrated in FIG. 16B.

Figure 17:
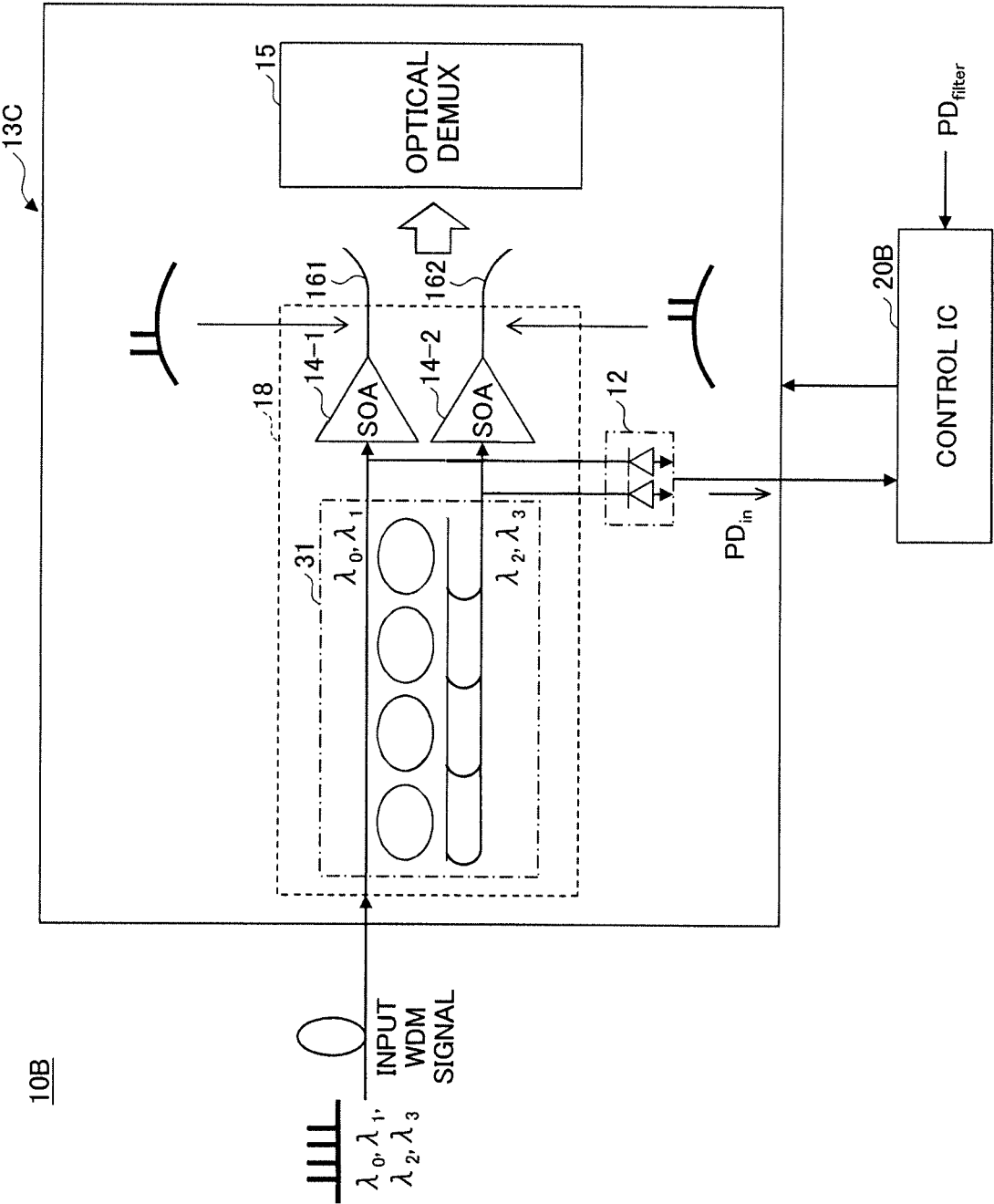
FIG. 17 illustrates a modification of the optical module of FIG. 13.

The PD 12 and the PDs 16 may be formed in the wavelength separation platform 13 by selective growth of, for example, germanium (Ge). When using Ge-PDs as the photodetectors, the optical waveguides may be branched between the wavelength filter 31 and the SOA 14-1, and between the wavelength filter 31 and the SOA 14-2 in a wavelength separation platform 13C, as illustrated in FIG. 17. This configuration can be applied to that of FIG. 13, as a modification of the second embodiment. In this case, the Ge-PDs are used as PDs 12 to monitor incident light to the SOA 14-1 and the SOA 14-2, respectively.

The threshold $\alpha$ and the threshold $\beta$ can be set individually for judgement of influence of external disturbance on incident light and for judgment of signal fluctuation in the monitored transmitted light. For example, a PD array of a compound semiconductor may be used as the PDs 16 to monitor the transmitted light through the filter, while Ge-PDs may be used as PDs 12 to monitor incident light to the SOA 14-1 and SOA 14-2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical module comprising:
   an optical amplifier that amplifies an optical signal in which multiple wavelengths are multiplexed;
   an optical demultiplexer that separates the multiple wavelengths from the optical signal having been amplified by the optical amplifier;
   a first photodetector that monitors the optical signal at an input side of the optical amplifier;
   a second photodetector that monitors each of the multiple wavelengths at an output side of the optical demultiplexer; and
   a control circuit that controls a center wavelength of a filter of the optical demultiplexer based upon a first monitor power of the first photodetector and a second monitor power of the second photodetector,
   wherein when an amount of change in the first monitor power reaches or exceeds a first threshold, the control circuit turns the center wavelength of the filter back to a previous wavelength position, and
   when the amount of change in the first monitor power becomes less than the first threshold, the control circuit adjusts the center wavelength of the filter based upon a latest measurement of the second monitor power.

2. The optical module as claimed in claim 1,
   wherein the optical amplifier and the optical demultiplexer are provided on a same substrate.

3. The optical module as claimed in claim 1,
   wherein the optical demultiplexer has a filter element formed by a silicon waveguide, and the control circuit controls the center wavelength of the filter by controlling a refractive index of the silicon waveguide.

4. The optical module as claimed in claim 1, further comprising:
a wavelength filter provided at the input side of the optical amplifier and configured to split a wavelength band of the optical signal into two or more groups, and
two or more optical amplifiers provided for the two or more groups of the wavelength band, each of the two or more optical amplifiers being the optical amplifier.

5. The optical module as claimed in claim 4,
wherein the first photodetector is provided at an input side of the wavelength filter.

6. The optical module as claimed in claim 4,
wherein the first photodetector is provided between the wavelength filter and the two or more optical amplifiers.

7. The optical module as claimed in claim 6,
wherein the first photodetector, the two or more of optical amplifiers, and the optical demultiplexer are provided on a same substrate.

8. The optical module as claimed in claim 7,
wherein the first photodetector is a germanium photodiode.

9. A control method of an optical module that has an optical amplifier that amplifies an optical signal in which multiple wavelengths are multiplexed and an optical demultiplexer that separates the multiple wavelengths from the optical signal having been amplified by the optical amplifier, the method comprising:
monitoring the optical signal at an input side of the optical amplifier to acquire a first monitor power,
monitoring the multiple wavelengths at an output side of the optical demultiplexer to acquire a second monitor power for individual demultiplexed wavelengths,
controlling a center wavelength of a filter of the optical demultiplexer based upon the first monitor power and the second monitor power for the individual demultiplexed wavelengths,
when an amount of change in the first monitor power reaches or exceeds a first threshold, turning the center wavelength of the filter back to a previous wavelength position, and
when the amount of change in the first monitor power becomes less than the first threshold, adjusting the center wavelength of the filter based upon a latest measurement of the second monitor power.

10. The control method as claimed in claim 9, comprising:
when the amount of change in the first monitor power reaches or exceeds the first threshold, turning a temperature of a heater provided to the filter back to a previous temperature, and
when the amount of change in the first monitor power becomes less than the first threshold, controlling the temperature of the heater based upon the latest measurement of the second monitor power.

11. The control method as claimed in claim 9,
wherein the controlling the center wavelength of the filter is performed at startup of the optical module, the method comprising:
sweeping the center wavelength of the filter over an entirety of a filter band; and
setting the center wavelength to a wavelength at which the second monitor power becomes a maximum.

12. The control method as claimed in claim 9,
wherein the controlling the center wavelength of the filter is performed at startup of the optical module, the method comprising:
sweeping the center wavelength of the filter from an edge of a filter band; and
setting the center wavelength of the filter to a wavelength at which the second monitor power becomes a local maximum.

13. The control method as claimed in claim 9,
wherein the controlling the center wavelength of the filter is performed during operation of the optical module, the method comprising:
shifting the center wavelength of the filter toward a shorter wavelength and a longer wavelength from an initial position at a predetermined step size, and
setting the center wavelength to a wavelength position at which the second monitor power becomes a maximum.

14. The control method as claimed in claim 9,
wherein the controlling the center wavelength of the filter is performed during operation of the optical module, the method comprising:
shifting the center wavelength of the filter toward a shorter wavelength and a longer wavelength from an initial position at a predetermined step size, and
when a current measurement of the second monitor power becomes smaller than a previous measurement of the second monitor power, turning the center wavelength back to a previous wavelength position and waiting for a predetermined time period.

* * * * *